(12) United States Patent
Shiba et al.

(10) Patent No.: US 9,957,422 B2
(45) Date of Patent: May 1, 2018

(54) ADHESIVE FOR PACKAGING MATERIALS, AND PACKAGING MATERIAL

(71) Applicant: UNITIKA LTD., Hyogo (JP)

(72) Inventors: Kenjin Shiba, Kyoto (JP); Takamasa Yoshino, Kyoto (JP); Takuma Yano, Kyoto (JP)

(73) Assignee: Unitika Ltd., Hyogo (JP)

( * ) Notice: Subject to any disclaimer, the term of this patent is extended or adjusted under 35 U.S.C. 154(b) by 369 days.

(21) Appl. No.: 14/402,739

(22) PCT Filed: Jun. 19, 2013

(86) PCT No.: PCT/JP2013/066782
§ 371 (c)(1),
(2) Date: Nov. 21, 2014

(87) PCT Pub. No.: WO2013/191191
PCT Pub. Date: Dec. 27, 2013

(65) Prior Publication Data
US 2015/0140348 A1    May 21, 2015

(30) Foreign Application Priority Data

Jun. 21, 2012  (JP) ................................ 2012-139355
Jul. 10, 2012  (JP) ................................ 2012-154676

(51) Int. Cl.
| | | |
|---|---|---|
| *C09J 7/02* | (2006.01) | |
| *B32B 27/32* | (2006.01) | |
| *C09J 123/26* | (2006.01) | |
| *B32B 15/085* | (2006.01) | |
| *C09J 123/08* | (2006.01) | |
| *B32B 37/12* | (2006.01) | |
| *B32B 37/15* | (2006.01) | |
| *C08L 23/08* | (2006.01) | |

(52) U.S. Cl.
CPC ........... *C09J 123/26* (2013.01); *B32B 15/085* (2013.01); *B32B 27/32* (2013.01); *B32B 37/1284* (2013.01); *B32B 37/153* (2013.01); *C09J 7/02* (2013.01); *C09J 7/0292* (2013.01); *C09J 123/0869* (2013.01); *B32B 2255/06* (2013.01); *B32B 2255/26* (2013.01); *B32B 2307/7265* (2013.01); *B32B 2439/00* (2013.01); *C08L 23/0869* (2013.01); *C09J 2423/00* (2013.01); *C09J 2429/00* (2013.01); *Y10T 428/31699* (2015.04); *Y10T 428/31913* (2015.04); *Y10T 428/31935* (2015.04)

(58) Field of Classification Search
None
See application file for complete search history.

(56) References Cited

U.S. PATENT DOCUMENTS

| | | | |
|---|---|---|---|
| 5,574,096 A | 11/1996 | Tanaka et al. | |
| 7,666,941 B2 | 2/2010 | Shiba et al. | |
| 8,637,152 B2 | 1/2014 | Shiba et al. | |
| 2003/0130380 A1* | 7/2003 | Figiel | C09J 11/06 524/47 |
| 2009/0269580 A1* | 10/2009 | Shiba | B32B 27/32 428/340 |

FOREIGN PATENT DOCUMENTS

| | | |
|---|---|---|
| CN | 1104654 A | 7/1995 |
| CN | 1791634 A | 6/2006 |
| JP | 11-254595 | 9/1999 |
| JP | 2001-322221 | 11/2001 |
| JP | 2003-171512 | 6/2003 |
| JP | 2008-120062 | 5/2008 |
| JP | 2008-127042 | 6/2008 |
| JP | 2010-005802 | 1/2010 |
| WO | 2004/104090 | 12/2004 |

OTHER PUBLICATIONS

Machine translation of JP 11-254595.
Machine translation of JP 2001-322221.
Machine translation of JP 2008-127042.
Machine translation of JP 2003-171512.
Machine translation of JP 2010-005802.
Chinese Office Action, dated Sep. 6, 2015, in corresponding Chinese Patent Application No. 201380032588.2.

* cited by examiner

*Primary Examiner* — Sheeba Ahmed
(74) *Attorney, Agent, or Firm* — Fildes & Outland, P.C.

(57) ABSTRACT

Disclosed is an adhesive for packaging materials being in a form of an aqueous dispersion including an acid-modified polyolefin resin containing a (meth)acrylic acid ester component, polyvinyl alcohol and an aqueous medium, wherein the content of polyvinyl alcohol is 0.1 to 10 parts by mass in relation to 100 parts by mass of the acid-modified polyolefin resin. Also disclosed is a packaging material using the adhesive wherein a barrier layer, an adhesive layer formed of a coating film obtained from the adhesive, and a sealant layer are laminated in this order.

16 Claims, No Drawings

ADHESIVE FOR PACKAGING MATERIALS, AND PACKAGING MATERIAL

TECHNICAL FIELD

The present invention relates to an adhesive for packaging materials and a packaging material, in particular, an adhesive for packaging materials and a packaging material which are capable of developing the resistance to specific contents.

BACKGROUND ART

As packaging materials, packaging materials in which a polyolefin-based resin film is laminated as a sealant layer on a barrier layer made of, for example, aluminum foil are frequently used. In general, the sealant layer is laminated on the barrier layer, through the intermediary of an adhesive layer (also referred to as, for example, a primer or an anchor coat).

However, when by using such packaging materials, a highly-irritating content such as a substance having volatility such as menthol or naphthalene, a content containing a fragrance component or a medicinal component, or a secondary battery containing a solid organic electrolyte is packaged, during storage of the package, such a substance or such a component affects the adhesive layer between the barrier layer and the sealant layer, and hence, the adhesion strength between the barrier layer and the sealant layer is disadvantageously degraded with time, or both layers peel off from each other (delamination).

Accordingly, in order to solve such problems as described above, JP11-254595A, JP2001-322221A and JP2008-127042A have proposed techniques for improving in the packaging materials the resistance against the contents in the packages. Here, "the resistance against the content" means the performance to suppress the degradation of the adhesion strength between the barrier layer and the sealant layer during the storage of the content. Hereinafter, this performance may foe referred to as "the content resistance."

In order to solve such problems as described above, the applicant of the present application has proposed, in JP2008-120062A, a method in which a specific adhesive layer is formed by applying an aqueous dispersion having a specific composition to a barrier layer and by drying the applied aqueous dispersion, and a sealant layer is laminated through the intermediary of the specific adhesive layer.

SUMMARY OF INVENTION

Technical Problem

However, according to the techniques described in JP11-254595A, JP2001-322221A and JP2008-127042A, packaging materials are found to have sufficient content resistance for common contents, but no sufficient content resistance can be expected for highly-irritating contents. In other words, such packaging materials as described above leave room for improvement with respect to the restricted application range of the packaging materials.

When the aqueous dispersion described in JP2006-120062A is applied to the barrier layer and dried to form the adhesive layer, though in rare cases, the warping of the barrier layer occurs, and in such cases, disadvantageously the handleability of the packaging material is degraded. Moreover, the aqueous dispersion of JP2008-120062A can be applied with known coaters such as a gravure coater. The coaters being used at common production sites are adapted to various types of coating materials such as aqueous coating materials and solvent-based coating materials; such coating materials are used in a manner being successively replaced from one coating material to another according to the intended purpose of use. At the time of the operation of replacing the coating material, when a small amount of a non-water-soluble solvent remains in the coating material storage tank, the coating material feed line, the coating material feed pan and the like attached to the coater, the aqueous dispersion of JP2008-120062A undergoes the occurrence of fine aggregates. In such a case, disadvantageously, uniform application to the barrier layer is difficult. In other words, disadvantageously, the aqueous dispersion of JP2008-120062A may find a trouble in the dispersion stability in the case of mixing of a non-water-soluble solvent (such as toluene).

The adhesive layers and the sealant layers commonly used in packaging materials are demanded to be small in the adsorption amount of the components of the contents. The adhesive layers described in JP11-254595A, JP2001-322221A and JP2008-127042A leave room for improvement with respect to the adsorptivity of the components of the contents.

The present invention solves such problems as described above, and an object of the present invention is to provide a packaging material exhibiting an excellent content resistance against highly-irritating contents as well as common contents, and an adhesive which is used for the packaging material, suppresses the warping of the barrier layer, is excellent in the dispersion stability for non-water-soluble solvents and suppresses the adsorption of the components of the packaged contents.

Solution to Problem

The present inventors have reached the present invention by discovering that the above-described technical problem can be solved by using an aqueous dispersion including a polyolefin resin having a specific composition and polyvinyl alcohol in specific proportions for the adhesive layer for use in a packaging material.

Specifically, the adhesive for packaging materials of the present invention is in a form of an aqueous dispersion including an acid-modified polyolefin resin containing a (meth)acrylic acid ester component, and including polyvinyl alcohol and an aqueous medium, wherein the content of polyvinyl alcohol is 0.1 to 10 parts by mass in relation to 100 parts by mass of the acid-modified polyolefin resin.

The packaging material of the present invention is a packaging material including a barrier layer, an adhesive layer and a sealant layer as laminated in this order, wherein the adhesive layer is formed of a coating film obtained from the aforementioned adhesive for packaging materials.

Advantageous Effects of Invention

The adhesive for packaging materials of the present invention is in a form of an aqueous dispersion including an acid-modified polyolefin resin containing a (meth)acrylic acid ester component, and including a predetermined amount of polyvinyl alcohol, hence can be suitably used for processing packaging materials, suppresses the occurrence of the warping of the barrier layer even when the adhesive is applied to the barrier layer and dried, and moreover, has an excellent effect on the dispersion stability of the aqueous dispersion (adhesive) even when a non-water-soluble solvent is mixed in the aqueous dispersion.

The packaging material of the present invention in which the coating film obtained from the adhesive for packaging materials of the present invention is disposed as the adhesive layer between the barrier layer and the sealant layer can exhibit excellent content resistance against various contents, in particular, even against highly-irritating contents such as contents including both of an acidic component and a spice because the adhesive layer includes the acid-modified polyolefin resin containing a (meth)acrylic acid ester component, and includes a predetermined amount of polyvinyl alcohol. Moreover, the adsorption of the components of the content to the adhesive layer is low. Accordingly, the packaging material of the present invention contributes significantly to the long-term quality maintenance of the content.

DESCRIPTION OF EMBODIMENTS

The adhesive for packaging materials of the present invention is suitable for the adhesion between the barrier layer and the sealant layer constituting the packaging material, and is in a form of an aqueous dispersion including an acid-modified polyolefin resin containing a (meth)acrylic acid ester component, and including polyvinyl alcohol and an aqueous medium. Additionally, the content of polyvinyl alcohol is 0.1 to 10 parts by mass in relation to 100 parts by mass of the acid-modified polyolefin resin.

The acid-modified polyolefin resin is described. The olefin component as the main component of the acid-modified polyolefin resin is not particularly limited, but is preferably an alkene having 2 to 6 carbon atoms such as ethylene, propylene, isobutylene, 2-butene, 1-butene, 1-pentene or 1-hexene from the viewpoint of the adhesiveness, and mixtures of these alkenes may also be used as the olefin component. Among these, the alkenes having 2 to 4 carbon atoms such as ethylene, propylene, isobutylene and 1-butene are more preferable, ethylene and propylene are furthermore preferable and ethylene is most preferable.

The acid-modified polyolefin resin is a resin acid-modified with an unsaturated carboxylic acid component. Examples of the unsaturated carboxylic acid component include: acrylic acid, methacrylic acid, (anhydrous) maleic acid, (anhydrous) itaconic acid, fumaric acid and crotonic acid. Additionally, examples of the unsaturated dicarboxylic acid also include; half-esters and half-amides of the unsaturated dicarboxylic acids. Among these, acrylic acid, methacrylic acid and (anhydrous) maleic acid are preferable from the viewpoint of the adhesiveness with the barrier layer, and acrylic acid and (anhydrous) maleic acid are particularly preferable. The unsaturated carboxylic acid component is only required to be copolymerized in the acid-modified polyolefin resin, and the form of the copolymerization of the unsaturated carboxylic acid component is not limited. Examples of the copolymerization state include random copolymerization, block copolymerization and graft copolymerization (graft modification).

It is to be noted that "(anhydrous) so-and-so acid" means "so-and-so acid or anhydrous so-and-so acid." Specifically, (anhydrous) maleic acid means maleic acid or maleic anhydride.

The content of the unsaturated carboxylic acid component can foe set at an appropriate value, among others, from the viewpoint of the balance between the adhesiveness with the barrier layer and the adhesiveness with the sealant layer, the content of the unsaturated carboxylic acid component is preferably 0.01 to 10% by mass, more preferably 0.1 to 5% by mass, furthermore preferably 0.5 to 4% by mass and most preferably 1 to 4% in relation to 100% by mass of the acid-modified polyolefin resin. When the content of the unsaturated carboxylic acid component is less than 0.01% by mass, in the case where an aluminum foil or the like is used as the barrier layer, a sufficient adhesiveness may tend to be hardly obtained. On the other hand, when the content of the unsaturated carboxylic acid component exceeds 10% by mass, the adhesiveness with the sealant layer may tend to be degraded.

Moreover, the acid-modified polyolefin resin is required to include a (meth)acrylic acid ester component. When the (meth)acrylic acid ester component is not included, no sufficient adhesiveness with the barrier layer or the sealant layer can be obtained. Examples of the (meth)acrylic acid ester component include the ester compounds between (meth)acrylic acid and alcohols having 1 to 30 carbon atoms; among these ester compounds, the ester compounds between (meth)acrylic acid and alcohols having 1 to 20 carbon atoms are preferable from the viewpoint of easy availability. It is to be noted that "so-and-so (meth)acrylate" means "so-and-so acrylate or so-and-so methacrylate." Specific examples of the (meth)acrylic acid ester component include; methyl(meth)acrylate, ethyl(meth)acrylate, propyl(meth)acrylate, butyl(meth)acrylate, hexyl(meth)acrylate, octyl(meth)acrylate, decyl(meth)acrylate, lauryl(meth)acrylate, octyl(meth)acrylate, dodecyl(meth)acrylate and stearyl (meth)acrylate. Mixtures of these compounds may also be used. Among these, from the viewpoint of easy availability and adhesiveness, methyl(meth)acrylate, ethyl(meth)acrylate, butyl(meth)acrylate, hexyl acrylate and octyl acrylate are more preferable, ethyl acrylate and butyl acrylate are furthermore preferable, and ethyl acrylate is particularly preferable.

In the present invention, just the inclusion of the (meth)acrylic acid ester component in the acid-modified polyolefin resin is enough, and the content of the (meth)acrylic acid ester component is optional. However, from the viewpoint of achieving the improvement of the content resistance, the content of the (meth)acrylic acid ester component is preferably 0.1 to 25% by mass, more preferably 1 to 20% by mass, furthermore preferably 2 to 18% by mass and particularly preferably 3 to 15% by mass in relation to 100% by mass of the acid-modified polyolefin resin. When the content of the (meth)acrylic acid ester component is less than 0.1% by mass, the adhesiveness with an aluminum foil or a polyolefin resin-based film may tend to be degraded, and when the content of the (meth)acrylic sold ester component exceeds 25% by mass, the content resistance may tend to be degraded. The (meth)acrylic acid ester component is only required to foe copolymerized in the acid-modified polyolefin resin, and the form of the copolymerization of the (meth)acrylic acid ester component is not limited. Examples of the copolymerization state include random copolymerization, block copolymerization and graft copolymerization (graft modification).

As a specific example of the acid-modified polyolefin resin, ethylene-(meth)acrylic acid ester-(anhydrous)maleic acid copolymer is most preferable. The form of the copolymer may be any of a random copolymer, a block copolymer and a graft copolymer; however, from the view point of easy availability, a random copolymer and a graft copolymer are preferable.

The acid-modified polyolefin resin may tend to be improved, as the molecular weight thereof is increased, in the content resistance when the adhesive for packaging materials of the present invention is used for the adhesion between the barrier layer and the sealant layer constituting the packaging material. Accordingly, the melt flow rate as a measure of molecular weight at 190° C. under a load of 2160 g may take any value, but is preferably 100 g/10 min or less, more preferably 30 g/10 min or less, furthermore preferably 0.001 to 20 g/10 min and particularly preferably 0.01 to 10 g/10 min. When the melt flow rate exceeds 100 g/10 min, the molecular weight of the resin is correspondingly decreased, and the content resistance may tend to be degraded. When the melt flow rate is less than 0.001 g/10 min, it is difficult to allow the resin to have a high molecular weight.

Hereinafter, polyvinyl alcohol is described. In the present invention, any type of polyvinyl alcohol can be used. Among others, a polyvinyl alcohol obtained by completely or partially saponifying a polymer of a vinyl ester can be preferably used. As the saponification method, a known alkali saponification method or a known acid saponification method can be adopted. Among others, a method in which the polymer of a vinyl ester is alcoholyzed in methanol by using alkali hydroxide is preferable.

Examples of the vinyl ester include: vinyl formate, vinyl acetate, vinyl propionate, vinyl pivalate and vinyl versatate; these can be used optionally. Among others, vinyl acetate is industrially most preferable.

The content of polyvinyl alcohol in the adhesive for packaging materials of the present invention is required to be 0.1 to 10 parts by mass present in relation to 100 parts by mass of the acid-modified polyolefin resin. Among others, the content of 0.1 to 5 parts by mass is preferable, the content of 0.1 to 4 parts by mass is more preferable, the content of 0.2 to 4 parts by mass is furthermore preferable, and the content of 0.3 to 3 parts by mass is particularly preferable. When the content of polyvinyl alcohol is less than 0.1 part by mass, the advantageous effects of the present invention are small, and when the content of polyvinyl alcohol exceeds 10 parts by mass, the adhesiveness with the substrate or the water resistance of the adhesive layer tends to degraded.

The degree of saponification of polyvinyl alcohol can adopt any value. Among others, from the viewpoint of the improvement of the chemical resistance of the coating film, the degree of saponification of polyvinyl alcohol is preferably 80 to 90.9 mol %, more preferably 90 to 99.9 mol % and furthermore preferably 95 to 99.9 mol %. When the degree of saponification of polyvinyl alcohol is less than 80 mol %, in the case where the adhesive layer of a packaging material is formed by using the adhesive for packaging materials of the present invention, the suppression effect of the adsorption of the components of the content may tend to be degraded, or the suppression effect of the warping in the packaging material may tend to be degraded.

The average degree of polymerization of polyvinyl alcohol can adopt any value. Among others, the average degree of polymerization of polyvinyl alcohol is preferably 100 to 3000, more preferably 300 to 2000, furthermore preferably 500 to 1500 and particularly preferably 500 to 1000. When the average degree of polymerization of polyvinyl alcohol is less than 100, the content resistance may tend to be degraded, and when the average degree of polymerization of polyvinyl alcohol exceeds 3000, the viscosity in the case of the aqueous dispersion (the adhesive for packaging materials) may tend to be too high.

In the present invention, from the viewpoint of obtaining a packaging material small in the degradation of the suppression effect of the adsorption of the components of the content and also excellent in the content resistance, it is preferable to use polyvinyl alcohol having a degree of saponification of 80 to 99.9 mol % and an average degree of polymerization of 100 to 3000.

Within a range not impairing the advantageous effects of the present invention, other vinyl compounds can be copolymerized with the vinyl ester. Examples of the vinyl-based monomers as the other vinyl compounds include: unsaturated monocarboxylic acids such as crotonic acid, acrylic acid and methacrylic acid, and esters, salts, anhydrides, amides and nitriles of these unsaturated monocarboxylic acids; unsaturated dicarboxylic acids such as maleic acid, itaconic acid and fumaric acid, and the salts of these acids; α-olefins having 2 to 30 carbon atoms such as ethylene; alkyl vinyl ethers; vinylpyrrolidones; and diacetone acrylamide.

In the case where ethylene is copolymerized, namely, in the case of an ethylene-vinyl alcohol copolymer, the content of ethylene is preferably 50 mol % or less and more preferably 40 mol % or less from the viewpoint of the content resistance.

As polyvinyl alcohol, a commercially available product can be used. Specifically, for example, the following can foe suitably used: "J-Poval" manufactured by Japan Vam & Poval Co., Ltd., "Kuraray Poval" and "Exeval" manufactured by Kuraray Co., Ltd., and "Denka Poval" manufactured by Denki Kagaku Kogyo K.K.

The acid-modified polyolefin resin and polyvinyl alcohol can be processed into an aqueous dispersion (adhesive for packaging materials), by dispersing or dissolving the acid-modified polyolefin resin and polyvinyl alcohol by such a method as described below. Specifically, the adhesive for packaging materials of the present invention represents an aqueous dispersion which includes the acid-modified polyolefin resin mainly in a state of being dispersed in an aqueous medium and polyvinyl alcohol mainly in a state of being dissolved in the aqueous medium. Here, the aqueous medium means water or a medium, composed of a liquid containing water. The aqueous medium may include, for example, a neutralizing agent contributing the dispersion stabilization of the acid-modified polyolefin resin and a water-soluble organic solvent.

The method for producing the adhesive for packaging materials of the present invention is not particularly limited. For example, the following methods can be adopted: a method in which the aqueous dispersion of the acid-modified polyolefin resin and the aqueous solution of polyvinyl alcohol are separately prepared, and then the aqueous dispersion and the aqueous solution are mixed with each other; and a method in which the solid acid-modified polyolefin resin and polyvinyl alcohol are placed in a batchwise manner in an aqueous medium, and both of the acid-modified polyolefin resin and polyvinyl alcohol are dispersed and dissolved in one and the same system.

Hereinafter, the aqueous dispersion of the acid-modified polyolefin resin is described.

The acid-modified polyolefin resin can be processed into an aqueous dispersion by dispersing the acid-modified polyolefin resin in an aqueous medium. As the dispersion method, a known dispersion method such as a self-emulsification method or a forced emulsification method may be adopted. As described above, when the acid-modified polyolefin resin is dispersed, a method may also be adopted in which polyvinyl alcohol is beforehand placed in a specific amount as a starting material, and polyvinyl alcohol and the acid-modified polyolefin resin are dispersed in a batch-wise manner into an aqueous dispersion together with the polyvinyl alcohol.

From the viewpoint of the adhesiveness, it is preferable to use, as the aqueous dispersion of the acid-modified polyolefin resin, an anionic aqueous dispersion obtained by neutralizing in an aqueous medium with a basic compound the unsaturated carboxylic acid component of the acid-modified polyolefin resin.

The aqueous medium used when the acid-modified polyolefin resin is dispersed into an aqueous dispersion is water or a medium composed of a water-containing liquid. In such media, a neutralizing agent or an organic solvent contributing to dispersion stabilization may also be included. Examples of the water-soluble organic solvent include: alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol; ketones such as methyl ethyl ketone, methyl isobutyl ketone, ethyl butyl ketone, cyclohexanone and isophorone; ethers such as tetrahydrofuran and dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate; glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol aminomethyl ether, diethylene glycol monoethyl ether, diethylene glycol monobutyl ether, diethylene glycol ethyl ether acetate, propylene glycol, propylene glycol mono-methyl ether, propylene glycol monobutyl ether and propylene glycol methyl ether acetate; 3-methoxy-3-methyl butanol, 3-methodybutanol, acetonitrile, dimethylformamide, dimethylacetamide, diacetone alcohol and ethyl acetoacetate. These organic solvents may be used as mixtures of two or more thereof. Among these, volatile water-soluble organic solvents having a boiling point of 140° C. or lower are preferably used for the purpose of reducing residual organic solvents at the time of forming the adhesive layer. Specific examples of such water-soluble organic solvents include ethanol, n-propanol, isopropanol and n-butanol.

Examples of the basic compounds used for neutralizing the unsaturated carboxylic acid component in the acid-modified polyolefin resin include: ammonia, triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, 3-methoxypropylamine, monoethanolamine, morpholine, N-methylmorpholine, N-ethylmorpholine, and alkali metals such as sodium hydroxide and potassium hydroxides. The basic compounds may be used as mixtures of two or more thereof. Among these, volatile basic compounds having a boiling point, of 140° C. or lower are preferably used, for the purpose of reducing residual basic compounds at the time of forming the adhesive layer. Specific examples of such basic compounds include ammonia, triethylamine and N,N-dimethylethanolamine.

As the method for dissolving polyvinyl alcohol in an aqueous medium, known methods may be adopted. Specifically, a method in which water is used as the aqueous medium, and polyvinyl alcohol is placed in water, and heated under stirring to be dissolved in water. By adding a specific amount of the thus obtained solution of polyvinyl alcohol to the aqueous dispersion of the acid-modified polyolefin resin, the adhesive for packaging materials (an aqueous dispersion including the acid-modified polyolefin resin, polyvinyl alcohol and an aqueous medium) of the present invention can be obtained. When the solution, of polyvinyl alcohol is added, it is preferable to add the solution of polyvinyl alcohol while the aqueous dispersion of the acid-modified polyolefin resin is being stirred.

The number average particle size of the dispersed particles in the adhesive for packaging materials is optional. Among others, the number average particle size is preferably 500 nm or less and more preferably 50 to 200 nm. When the number average particle size exceeds 500 nm, the storage stability of the adhesive for packaging materials may tend to be degraded, or the application with a uniform thickness comes to be difficult and consequently no stable effects may tend to be obtained. The dispersed particles in the adhesive for packaging materials usually mean the dispersed particles of the acid-modified polyolefin resin.

The solid content concentration (nonvolatile component concentration) of the adhesive for packaging materials of the present invention is optional. Among others, the solid content, concentration is preferably within a range from 1 to 50% by mass in relation to the total amount of the adhesive for packaging materials in the form of the aqueous dispersion.

The adhesive for packaging materials of the present invention may include a resin other than the acid-modified polyolefin resin and polyvinyl alcohol, in an amount not impairing the advantageous effects of the present invention. Specifically, the content of such a resin is preferably 30 parts by mass or less in relation to 100 parts by mass of the acid-modified polyolefin resin. Examples of such a resin include: polyvinyl acetate, ethylene-vinyl acetate copolymer, polyvinyl chloride, polyvinylidene chloride, ethylene-(meth)acrylic acid copolymer, styrene-maleic acid resin, styrene-butadiene resin, butadiene resin, acrylonitrile-butadiene resin, poly(meth)acrylonitrile resin, (meth)acrylamide resin, polyethylene chloride resin, polypropylene chloride resin, polyester resin, modified nylon resin, urethane resin, phenolic resin, silicone resin and epoxy resin. The number average molecular weight of such a resin is optional. Among others, from the viewpoint of the content resistance, the number average molecular weight of such a resin is preferably 10000 or more and more preferably 30000 or more.

The adhesive for packaging materials of the present invention may also include a cross-linking agent to cross-link the acid-modified polyolefin resin and/or polyvinyl alcohol. Examples of the cross-linking agent include: polyisocyanate compounds, polymelamine compounds, urea compounds, polyepoxy compounds, polycarbodiimide compounds, polyoxazoline group-containing compounds, polyhydrazide compounds, polyzirconium salt compounds and silane coupling agents. The content of the cross-linking agent may be appropriately determined in consideration of the content resistance. Among others, the cross-linking agent is preferably included in a range of 20 parts by mass or less in relation to 100 parts by mass of the total amount of the acid-modified polyolefin resin and polyvinyl alcohol.

Such resins and cross-linking agents as described above, other than the acid-modified polyolefin resin and polyvinyl alcohol, are preferably water soluble or dispersible in aqueous media from the viewpoint of the ease of addition and mixing.

The adhesive for packaging materials of the present invention can be suitably used as the adhesive layer in the packaging material constituted by laminating a barrier layer, an adhesive layer and a sealant layer in this order.

Hereinafter, the packaging material of the present invention is described.

The packaging material of the present invention is a packaging material including a barrier layer, an adhesive layer and a sealant layer laminated in this order.

The barrier layer may be constituted with any materials capable of blocking liquid and gas. Specific adoptable examples of the barrier layer include, in addition to soft metal foil such as aluminum: vapor-deposited layers such as aluminum vapor-deposit, silica vapor-deposited, alumina vapor-deposited, silica-alumina binary vapor-deposited layers; and organic barrier layers made of vinylidene chloride-based resin, modified polyvinyl alcohol, ethylene-vinyl alcohol copolymer, MXD nylon, and the like.

When a vapor-deposited layer is applied as the barrier layer, commercially available films having a vapor-deposited layer is conveniently used. Such films having such a vapor-deposited layer can be exemplified by "IB Series" manufactured by Dai Nippon Printing Co., Ltd., "GL, GX Series" manufactured by Toppan Printing Co., Ltd., "Barrier-Locks," "VM-PET," "YM-CPP" and "VM-OPP" manufactured by Toray Advanced Film Co., Ltd., "Techbarrier" manufactured by Mitsubishi Plastics, Inc., "Metaline" manufactured by Tohcello Co., Ltd., and "MOS," "Tetolight" and "P-bright" manufactured by Oike & Co., Ltd. A protective coating layer may also be provided on the surface of the vapor-deposited layer.

When an organic barrier layer is applied as the harrier layer, a laminated film having an organic barrier layer is conveniently used. In this case, as the film concerned, a specially prepared film such as a film obtained by applying to a film a coating material including a resin having barrier property or a film obtained by laminating the aforementioned resin with a coextrusion method can be used. However, commercially available films having an organic barrier layer are conveniently and preferably used. Such films having an organic barrier layer can be exemplified by "Kurarister" and "Eval" manufactured by Kuraray Co., Ltd., "Besela" manufactured by Kureha Chemical Industry Co., Ltd., "Superneal" manufactured by Mitsubishi Plastics, Inc., "Kohbarrier" manufactured by Kohjin Co., "Sevix (registered trade mark)," "Emblon M," "Emblon E," "Emblem DC," "Emblet DC" and "NV" manufactured by Unitika Ltd., "K-OP" and "A-OP" manufactured by Tohcello Co., Ltd., and "Senesi" manufactured by Daicel Corp.

In the present invention, as the barrier layer, from the viewpoint of barrier property, vapor-deposited layers of, for example, aluminum, silica and alumina are generally preferable in addition to aluminum foil. Because of being particularly low in price, barrier layers formed by using aluminum such as aluminum foil and aluminum vapor deposition layers are preferable. The thickness of the barrier layer is not particularly limited. For example, in the case of aluminum foil, a thickness failing within a range from 3 to 50 μm is preferable from economical aspect.

For the barrier property in the barrier layer, an optimal range may be appropriately selected according to the contents to be packaged or the storage period. Among others, the water steam permeability is approximately preferably 100 g/m$^2$·day (40° C., 90% RH) or less, more preferably 20 g/m$^2$·day or less, furthermore preferably 10 g/m$^2$·day or less and particularly preferably 1 g/m$^2$·day or less. The oxygen permeability is preferably 100 ml/m$^2$·day·MPa (20° C., 90% RH) or less, more preferably 20 ml/m$^2$·day·MPa or less, furthermore preferably 10 ml/m$^2$·day·MPa or less and particularly preferably 1 ml/m$^2$·day·MPa or less.

The adhesive layer is a coating film obtained from the adhesive for packaging materials of the present invention. Specifically, the composition of the adhesive layer includes the acid-modified polyolefin resin and polyvinyl alcohol, wherein the content of polyvinyl alcohol is 0.1 to 10 parts by mass in relation to 100 parts by mass of the acid-modified polyolefin resin.

As described below, the adhesive layer can be formed by applying the adhesive for packaging materials of the present invention to at least one surface of the barrier layer and by drying the applied adhesive.

The amount of the adhesive layer is optional. Among others, in relation to the area of the adhesive surface, the amount of the adhesive layer is in a range of preferably 0.001 to 5 g/m$^2$, more preferably 0.01 to 3 g/m$^2$, furthermore preferably 0.02 to 2 g/m$^2$, particularly preferably 0.03 to 1 g/m$^2$ and most preferably 0.05 to 1 g/m$^2$. When the amount of the adhesive layer is less than 0.001 g/m$^2$, no sufficient content resistance may tend to be obtained. On the other hand, when the amount of the adhesive layer exceeds 5 g/m$^2$, economical disadvantage may tends to occur.

As the sealant layer, known sealant resins can be used. Examples of such sealant resins include: polyethylenes such as low density polyethylene (LDPE), linear low density polyethylene (LLDPE) and high density polyethylene (HDFB); and polyolefins such as acid-modified polyethylene, polypropylene (PP), acid-modified, polypropylene, copolymerized polypropylene, ethylene-vinyl acetate copolymer, ethylene-(meth)acrylic acid, ester copolymer, ethylene-(meth)acrylic acid copolymer and ionomer. Among these resins, from the viewpoint of low-temperature sealing property, polyethylene-based resins are preferable, and because of being low in price, polyethylene is particularly preferable. The thickness of the sealant layer is not particularly limited, but in consideration of the processability into packaging materials and the heat-sealing property, the thickness of the sealant layer is within a range preferably from 10 to 60 μm and more preferably from 15 to 40 μm. By providing the sealant layer with asperities having height differences of 5 to 20 μm, the sealant layer can be imparted with slippage and the tearability of packaging materials.

In the present invention, examples of the method for forming the adhesive layer include: a method in which the adhesive for packaging materials of the present invention is applied to at least one surface of the barrier layer and the aqueous medium is partially or wholly dried to form a coating film; and a method in which the adhesive for packaging materials of the present invention is applied to a piece of release paper, the aqueous medium is partially or wholly dried from the piece of release paper to once form a coating film, and subsequently the coating film is transferred to at least one surface of the barrier layer. Among others, e method in which the adhesive for packaging materials of the present invention is applied to at least one surface of the barrier layer and the aqueous medium is partially or wholly dried to form a coating film is preferable from the viewpoints of the environment, the performances and the easy regulation of the amount of the adhesive layer. In this case, a method may be quoted in which the adhesive for packaging materials is applied to at least one surface of the barrier layer and dried to form the adhesive layer, and subsequently the sealant layer is laminated on the adhesive layer by inline melt extrusion (extrusion lamination) of the sealant resin. This method is simple and is a particularly preferable method for the purpose of improving the effect of the content resistance.

Examples of the method for applying the adhesive for packaging materials include known methods such as gravure roll coating, reverse roll coating, wire bar coating, lip coating, air knife coating, curtain flow coating, spray coating, dip coating, and brush painting. By using these methods, the adhesive for packaging materials is uniformly applied to the surface of the barrier layer, and if necessary, subjected to setting at the room temperature or the like, and then subjected to drying treatment or heat treatment for drying. By this heat treatment, the aqueous medium is partially or wholly dried, and thus a uniform coating film can foe formed. That is to say, the adhesive layer can be formed so as to be brought into close contact with the surface of the barrier layer. In the drying, if is preferable to dry the whole of the aqueous medium, from the viewpoint of making satisfactory the adhesiveness and the content resistance.

Alternatively, the below described substrate layer or the like is laminated on either one surface of the barrier layer, and subsequently the adhesive for packaging materials may foe applied to the other surface of the barrier layer and dried to form the adhesive layer.

In the present invention, the method for further laminating the sealant layer on the adhesive layer laminated on the barrier layer is not particularly limited. Examples of the method for further laminating the sealant layer include; a method in which the adhesive layer and the sealant resin film are laminated on each other by heat (heat lamination, dry lamination); and a method in which the sealant resin is melted and extruded on the adhesive layer, and cooled and solidified for lamination (extrusion lamination method). Among others, the extrusion lamination method is preferable because of the possibility of making the thin adhesive layer, the easy improvement of the content resistance and other reasons. The temperature of the molten sealant resin at the time of extrusion can be appropriately set. Among others, from the viewpoint of making satisfactory the adhesiveness with the barrier layer through the intermediary of the adhesive layer and the content resistance, the temperature of the molten sealant resin at the time of extrusion is preferably within a range from 200 to 400° C., more preferably within a range from 250 to 350° C. and furthermore preferably within a range from 280 to 330° C. The molten sealant resin at the time of extrusion may be subjected to ozone treatment or the like, for the purpose of improving the adhesiveness and the content resistance, and improving the line speed.

Usually, the packaging material of the present invention is used for packaging with the barrier layer as the outside and the sealant layer as the inside layer (the content side). Usually, in consideration of the applications and required performances (easy testability and hand cuttability) as the packaging material, the rigidity and the durability (for example, impact resistance and pinhole resistance) required as the packaging material, if necessary, another layer can also be laminated on the outside or the inside of the barrier layer. Usually, the packaging material is used with the substrate layer, the paper layer, a second sealant layer and a non-woven fabric layer on the outside of the barrier layer. As the method for laminating other layers, known methods can be used. For example, other layers may be laminated by disposing an adhesive layer in the interlayer space with the other layer and by dry laminating, heat laminating, heat sealing or extrusion laminating. As the adhesive, for example, a one-component type urethane-based adhesive, a two-component type urethane-based adhesive, an epoxy-based adhesive, and an aqueous dispersion of an acid-modified polyolefin can be used. The adhesive for packaging materials of the present invention may also be used without causing any particular problem.

Specific examples of the laminate configuration include: substrate layer/barrier layer/adhesive layer/sealant layer, which can be suitably used for, for example, common packaging materials, lid materials, and repacking containers; first sealant layer/paper layer/barrier layer/adhesive layer/second sealant layer, first sealant layer/paper layer/polyolefin resin layer/substrate layer/barrier layer/adhesive layer/second sealant layer, paper layer/barrier layer/adhesive layer/sealant layer, substrate layer/paper layer/barrier layer/substrate layer/adhesive layer/sealant layer, which can be suitably used for, for example, paper vessels and paper cups; first sealant layer/barrier layer/adhesive layer/second sealant layer, which can be suitably used for, for example, tubular containers. These laminates may have, if necessary, for example, printing layers or top coating layers.

As the substrate layer, for example, the following are used: films of polyester resins such as polyethylene terephthalate (PET), polyethylene naphthalate (PEN) and polylactic acid (PLA); films of polyolefin resins such as polypropylene; polystyrene resin film; films of polyamides such as nylon 6 and poly-p-xylylene adipamide (MXD6 nylon); polycarbonate resin film; polyacrylonitrile resin film; polyimide resin film; composite laminates of these (for example, nylon 6/MXD6/nylon 6, nylon 6/ethylene-vinyl alcohol copolymer/nylon 6) and mixtures of these. Among others, resin films having mechanical strength and dimensional stability are preferable. In particular, among these, optionally biaxially stretched films are preferably used. Examples of the paper layer include natural paper layers and synthetic paper layers. The first and second sealant layers can be formed with the same materials as for the above-described sealant layer. A printing layer may be provided on the outer surface or the inner surface of each of the substrate layer and the paper layer.

These "other layers" may include known additives and stabilizers, such as an antistatic agent, an easily adhesive coating agent, a plasticizer, a lubricant, an antioxidant and the like. The "other layers" may also be those films whose surfaces are subjected to pretreatments such as corona treatment, plasma treatment, ozone treatment, chemical treatment and solvent treatment, for the purpose of improving the adhesiveness in the lamination with the other materials.

The thickness of the "other layers" may be determined in consideration of the adaptabilities as packaging materials and processability in lamination, without being particularly limited. Practically, the thickness concerned are preferably in a range from 1 to 300 μm. However, depending on the intended application, the "other layers" of more than 300 μm in thickness may also be adopted.

Examples of the form of the packaging material of the present invention include various forms such as a three side-sealed bag, a four side sealed bag, a gazette packaging bag, a pillow packaging bag, a gable top-type bottomed container, the tetra classic, a brick, type container, a tubular container, a paper cup and a lid. Among these, as a paper cup, for example, a paper cup can be quoted in which the blank plates for the trunk portion and the bottom portion are prepared, the blank plates are used to form the tubular trunk, portion and the bottom portion at one opening end of the trunk portion with a cup forming machine, and these portions are heat, bonded to each other.

An easy-to-unseal treatment may also be applied to the packaging material of the present invention. Specifically, a treatment for forming a cut line, a half-cut line, a perforation or the like may also be applied. Alternatively, a cut (notch) may also be appropriately provided at an unsealing position.

A reseating portion may also be appropriately provided. Specifically, the resealability may be provided by applying an adhesive to the innermost sealant layer, or a packaging bag with chuck may be prepared by providing a chuck made of a polyethylene resin or a polypropylene resin. The adhesive for packaging materials of the present invention, is also excellent in the adhesiveness with such a chuck. Moreover, the adhesive for packaging materials of the present invention is also suitable for deep drawing molding.

The packaging bag with a chuck preferably has a structure in which the packaging bag has an opening portion at one end of the packaging bag, and the chuck made of a resin is provided on the sealant layer as the innermost layer, in the vicinity of the opening portion. When the content of the packaging material of the present invention is an alcoholic beverage, a bath additive, a spice, a fomentation, a patch or the like, the provision of a chuck is convenient from the viewpoint of the long term storage after unsealing. The provision of a chuck allows the content to be conveniently taken out and in. The chuck is generally constituted with a pair of chuck members, the male portion of one of the chuck members and the female portion of the other of the chuck members engage with each other so as for the packaging bag to be hermetically sealed. The male portion and the female portion are bonded to the facing sealant layers of the packaging materials, respectively. The adhesive for packaging materials of the present invention is also excellent in the adhesiveness with such a chuck. The packaging bag with a chuck is produced in a state of being sealed at the outside of the opening portion provided with the chuck, after the content is housed therein, and hence the packaging bag with a chuck can cope with the long term storage of the content. Such a packaging bag is preferably provided with a tear portion, between the sealing portion and the chuck, cuttable or tearable at the time of use of the content.

As the material for forming the chuck, polyolefin resin is preferable; among others, because of being low in price, a material mainly composed of polyethylene resin or polypropylene resin is more preferable, and a material mainly composed of polyethylene resin is particularly preferable. Among others, LDPE and LLDPE are particularly preferable.

The male portion and the female portion of the chuck members are separately prepared by extrusion molding, and are preferably formed with LDPE having a flexural modulus of elasticity of 50 to 500 MPa. When the flexural modulus of elasticity is less than 50 MPa, the engagement strength of the chuck is weakened or the letting out of the bags at the time of the bag production is made difficult. On the other hand, when the flexural modulus of elasticity exceeds 500 MPa, the strength at the time of repeated unsealing or the strength after the reseating is degraded, or the chuck is damaged.

LDPE having a melt index (MI) of 1 to 15 g/10 min is preferable, and LDPE having a melt index of 2 to 8 g/10 min is more preferable. When the MI is less than 1 g/10 min, melt facture tens to occur, and when the MI exceeds 15 g/10 min, the moldability (mold retention capability) is degraded. For the chock members, polymers other than LDPE, such as polypropylene, ethylene-vinyl acetate copolymer and ethylene-(meth)acrylic acid copolymer can be used.

The packaging material of the present, invention has satisfactory resistance against various contents because the adhesive for packaging materials of the present invention is used in the packaging material of the present invention. Accordingly, the packaging material of the present invention is particularly suitable as the packaging material for contents having volatility and highly-irritating contents. Among others, the packaging material of the present invention is most suitable as the packaging materials for the products having a fragrance component, a spice component and a medicinal component. Specifically, the packaging material of the present invention is suitably used for; alcohols (for example, high concentration alcohols of 50% by mass or more in alcohol concentration), alcoholic beverages, antioxidants, sulfurous acid salts, aromatic substances, fragrance, bath additives (liquid type, powder type), spices (clove, *capsicum*), fomentations, patches, pharmaceuticals, battery electrolytes, toiletry products, surfactants, shampoo, rinse, detergents, vehicle detergents, perm solutions, insect repellents, insecticides, antiseptic solutions, deodorants, hair restorer, vinegars, dentifrice, cosmetics, developers, hair dyes, tooth powder, mustard, oil, curry, kimchi spice powder mixtures, Tabasco (spice using *Capsicum frutescens* as starting material, registered trademark), basic substance-containing products, and acidic substance-containing products.

Among the above-described contents, the packaging material of the present invention can be suitably used for packaging the permeating component-containing liquid substances. Here, the permeating component-containing liquid substances means the liquid substances which contain irritating components, fragrance components, medicinal components, highly volatile components and oil components, permeating the sealant layer and/or the adhesive layer and thus being capable of degrading the adhesiveness. Specifically, examples of the permeating component-containing liquid substances include: alcoholic beverages, liquid detergents, shampoo, rinse, battery electrolytes, vinegar and oil.

The packaging material of the present invention can also be suitably used for packaging the permeating component-containing pasty substances such as cosmetics, pharmaceuticals, seasonings and foods, among the above-described contents. The packaging material used for this application is suitably a tubular container from the viewpoint of handleability of the permeating component-containing pasty substances as the contents. The tubular container can be produced, for example, as follows: a tubular shape is formed by using the packaging material of the present invention, one opening portion of the resulting tubular shape is sealed by heat sealing or the like, and the other opening portion of the tubular shape is provided with a head portion having a shoulder portion and a mouth portion. The mouth portion may be provided with a nozzle, a hinge cap, a check valve and a seal material.

Moreover, the packaging material of the present invention can also be suitably used for packaging the volatile component-containing solids such as the spices and the bath additives among the above-described contents. The shape of the content is exemplified by powder shapes, flake shapes, pellet shapes, block shapes, cube shapes, tablet shapes, crumble shapes, ball shapes, particle shapes, granular shapes, pi sty shapes, spherical shapes and string-like shapes.

The packaging material of the present invention can be suitably used as the packaging material for use in repacking for packaging the content to be used for repacking into a container. In this case, at the time of repacking, the content is conveniently transferred into another container such as a bottle, and hence it is preferable to provide a spout in a portion of the packaging material. The position for fitting the spout is not particularly limited, but from the viewpoint of facilitating the operation of discharging the content, it is preferable to fit the spout at an upper center or at a corner of the packaging material. The shape of the spout is not particularly limited, the spout may be provided in a form continuously protruding from the main body of the bag, or alternatively the spout may be formed with a material different from the material of the main body of the bag. A screwed cap or the like may be fitted to the spout.

From the viewpoint of storing the content over a long term, it is preferable to heat seal the outer circumference of the tip of the spout. The heat sealed portion of the tip of the spout is preferably subjected to an easy-to-unseal treatment in order to facilitate the unsealing. Specifically, a treatment for forming a cut line, a half-cut line, a perforation or the like may also be applied. A cut (notch) may also be appropriately provided at an unsealing position.

The details of the causes for the degradation of the adhesion strength between the layers in the packaging material having barrier property are not clear; however, probably the degradation of the adhesion strength may be ascribable to what is described as follows: the volatile components of the content are blocked by the barrier layer and accumulated in the vicinity of the interface between the barrier layer and the adhesive layer, and thus the adhesive layer undergoes the degradation such as swelling or dissolution. It is inferred that in the packaging material of the present invention, by using an adhesive layer having a specific composition, the degradation of the adhesive layer is alleviated, and consequently a satisfactory content resistance is obtained.

EXAMPLES

Hereinafter, the present invention is described specifically by way of Examples.

1. Properties of Adhesive for Packaging Materials (1) Composition of Acid-Modified Polyolefin Resin The composition was determined with a 1H-NMR Analysis apparatus (ECA500, 500 MHz, manufactured by JEOL Ltd.). The measurement was performed by using tetrachloroethane (d2) as the solvent at 120° C.

(2) Melt Flow Rate (MFR) of Acid-Modified Polyolefin Resin

The melt flow rate was measured according to the method described in Japanese Industrial Standard K7210:1999, at 190° C., under a load of 2160 g.

(3) Degree of Saponification and Average Degree of Polymerization of Polyvinyl Alcohol The degree of saponification and the average degree of polymerization of polyvinyl alcohol were measured according to the methods described in Japanese Industrial Standard K6726:1994.

(4) Number Average Particle Size of Dispersed Particles of Aqueous Dispersion

The number average particle size was determined with the Micretrac particle size distribution analyzer (UPA150, MODEL No. 9340, dynamic light scattering method, manufactured by Nikkiso Co., Ltd.). The refractive index of the resin, used for the calculation of the particle size was taken as 1.50.

(5) Dispersion Stability with Non-Water-Soluble Solvent

In a transparent glass bottle having an inner capacity of 30 ml, 20 g of the adhesive for packaging materials and 0.5 g of toluene (non-water-soluble solvent) were placed, and then the glass bottle was sealed and vigorously shaken to mix the adhesive for packaging materials and toluene with each other. After the mixing, the state of the adhesive for packaging materials in the vessel was visually observed, and evaluated according to the following indexes.

Good: No occurrence of aggregates
Average: Slight occurrence of aggregates
Poor: Occurrence of aggregates (6) Adsorptivity of Content Components On a sheet made of polytetrafluoroethylene, the adhesive for packaging materials was dried at 120° C., for 5 hours, to form an adhesive layer (a coating film obtained from the adhesive for packaging materials) having a thickness failing within a range from 100 to 120 μm. Then, the adhesive layer was peeled off from the polytetrafluoroethylene sheet. Subsequently, a piece of the adhesive layer was cut out so as to have a mass of 0.3 g, the piece of the adhesive layer was placed in a glass vessel having an inner capacity 100 ml and containing 20 g of limonene, and the vessel was sealed and maintained at 50° C. The inside space of the vessel was partitioned into upper and lower sections so as for the limonene and the piece of the adhesive layer not to foe brought into contact with each other. In this way, the piece of the adhesive layer was exposed to the limonene gas at 50° C. for 5 days, the mass of the piece of the adhesive layer was measured, and the adsorption percentage was calculated with the following formula (the lower the adsorption percentage, the lower the adsorptivity of the adhesive layer).

Adsorption percentage (%)=(Mass of adhesive layer (g) after exposure−0.3 (g))÷0.3 (g)×100

(7) Water Resistance

On a sheet made of polytetrafluoroethylene, the adhesive for packaging materials was dried at 120° C. for 5 hours to form an adhesive layer (a coating film obtained from the adhesive for packaging materials) having a thickness failing within a range from 100 to 120 μm. Then, the adhesive layer was peeled off from the polytetrafluoroethylene sheet. Subsequently, the state of the adhesive layer after immersion of the adhesive layer in water at 40° C. for 3 days was visually observed, and evaluated according to the following indexes.

Good: No change at all
Average: Slight occurrence of whitening
Poor: Occurrence of whitening
Sad: Occurrence of at least partial dissolution of adhesive layer (8) Warping of Barrier Layer A biaxially stretched polyethylene terephthalate film having a thickness of 12 μm and an aluminum foil having a thickness of 7 μm were laminated on each other with a two-component curing type polyurethane-based adhesive to yield a laminate. Then, the adhesive for packaging materials was applied to the aluminum surface of the laminate so as for the amount of the adhesive layer after drying to be 3 g/m$^2$, and then dried at 120° C. for 120 seconds. Subsequently, the laminate provided with the adhesive was cut out to a 100 mm×100 mm square, and the resulting square laminate was allowed to stand still on a horizontal, flat table so as for the adhesive layer surface to be on the upper side. Successively, the square laminate was maintained at 20° C. and at 65% RH for one hour, and then the distance between the highest position of the laminate and the table surface was measured to evaluate the warping of the laminate on the basis of the following standards. The number of the performed test runs was five, and the average value thus obtained was used as the warping value. As can be determined in this test, the longer the distance, the larger the degree of the warping.

Excellent: The distance is less than 5 mm.
Good: The distance is 5 mm or more and less than 10 mm.
Average: The distance is 10 mm or more and less than 15 mm.
Poor: The distance is 15 mm or more and less than 20 mm.
Bad; The distance is 20 mm or more.

2. Properties of Packaging Material (1) Amount of Adhesive Layer (coating amount)

The substrate (corresponding to a laminate having a barrier layer and a film having a barrier layer in each of Examples or Comparative Examples) whose area and mass were beforehand measured was coated with a predetermined amount of the adhesive for packaging materials in each of Examples and with a predetermined amount of an adhesive in each of Comparative Examples, and the applied adhesive for packaging materials and the applied adhesive were dried at 100° C. for 120 seconds. For each of the thus obtained laminates, the mass thereof was measured, and the mass of the substrate before coating was subtracted from the mass of the laminate to yield a coating amount. From the coating amount and the coated area, the layer amount per unit area ($g/m^2$) was calculated.

(2) Laminate Strength (before Content Resistance Test)

From a laminate film, a specimen of 15 mm in width was sampled, and the strength was measured by peeling the interface between the barrier layer and the sealant layer from one end of the specimen by using a tensile tester (Precision Universal Material Tester, Model 2020, manufactured by Intesco Co., Ltd.) and by adopting the T-peel method. The measurement was performed in an atmosphere of 20° C. and 65% RH at a tensile rate of 200 mm/min. When the laminate strength is high, the sealant film may undergo elongation and/or breakage at the time of measurement so as to make the peeling impossible. Such a phenomenon is most preferable as the laminate state.

(3) Content Resistance Test

Two pieces of 10-cm-square laminate films were used, the sealant layers were arranged to face inside, the content was placed between the films, and then the four sides of the set of the two films were hermetically sealed with a sealing width of 10 mm by heat sealing to yield a packaging material. The packaging materials thus obtained were stored at 50° C. for two weeks. Subsequently, each of the hermetically sealed packaging materials was unsealed, and in the same manner as in above-described (2), a specimen was sampled from the laminate film of the packaging material and the laminate strength was measured.

(4) Tear Property

At the time of unsealing the bag after the content resistance test, a portion of the bag was provided with a cut, then the bag was torn with hands and the condition of the torn bag was visually observed to be evaluated on the basis of the following indexes.

Good: The tear property was good, and no delamination between films occurred.

Poor: The tear property was poor, and the delamination between the films occurred.

(5) Evaluation of Chuck Portion (before Content Resistance Test)

The packaging material made of the obtained laminate film was cut to a size of 150 mm×180 mm; the sealant layer surface of the chuck forming portion of the portion to be the opening of a packaging bag composed of two pieces of the packaging material, and the joint surfaces of the chuck, members made of LLDPE (only in the case of Example 96, chuck members made of polypropylene resin was used) were respectively subjected to the easy-to-join treatment based on corona discharge treatment. Subsequently, by using a heat sealer, at 160° C., the chuck members were melt-bonded to the chuck forming portions of the packaging materials (only in the case of Example 96, at 200° C., the chuck members were melt-bonded to the chuck forming portions of the packaging materials). Next, the portions to be the side portions and the bottom portion of the packaging bag based on the packaging materials were melt-bonded by a heat sealer to yield a packaging bag with a chuck.

For the chuck portion of the obtained packaging bag with a chuck, an opening-closing test by hands was performed 50 times, then the occurrence or nonoccurrence of troubles (such as the peeling of the chuck members from the chuck forming portion, and cracking of the chuck members) was visually observed, and thus the chuck portion was evaluated on the basis of the following standards.

Good: Neither peeling nor cracking occurs.

Poor: Peeling and/or cracking occurs.

(5) Evaluation of Chuck Portion (after Content Resistance Test)

A content was placed in the packaging bag with a chuck, then the chuck was closed, and further a portion closer to the opening end side than the chuck in the packaging bag was hermetically sealed by heat sealing, and the packaging bag was stored at 50° C. for 2 weeks. Subsequently, the bag was unsealed, and for the chuck portion, an opening-closing test by hands was performed 50 times, then the occurrence or nonoccurrence of the same troubles as described above (such as peeling and cracking) was visually observed, and thus the chuck portion was evaluated on the basis of the following standards.

Good: Neither peeling nor cracking occurs.

Poor: Peeling and/or cracking occurs.

[Production of Aqueous Dispersion E-1 of Acid-Modified Polyolefin Resin]

By using a stirrer having a 1-liter volume, hermetically sealable pressure-resistant glass vessel equipped with a heater, 60.0 g of an acid-modified polyolefin resin (Bondine "TX-8030 (hereinafter, sometimes abbreviated as "TX8030")," manufactured by Arkema Co., Ltd.), 90.0 g of isopropanol, 3.0 g of triethylamine and 147.0 g of distilled water were placed in the glass vessel, and stirred at a rotation speed of stirring blades set at 300 rpm. Thus, no precipitation of the granular form of the resin was found on the bottom of the vessel, and the granular form of the resin was verified to take a suspension state. Accordingly, after 10 minutes, while this state was being maintained, the power of the heater was turned on for heating. Thus, while the temperature within the reaction system, was being maintained at 140 to 145° C., the reaction system was stirred further for 30 minutes. Then, the reaction system was cooled down to room temperature (about 25° C.) under stirring at the unaltered rotation speed of 300 rpm. And then, the resulting mixture was pressure-filtered (air pressure: 0.2 MPa), with a 300-mesh stainless steel filter (wire diameter: 0.035 mm, plain weave) to yield milky white, uniform aqueous dispersion "E-1" of an acid-modified polyolefin resin.

[Production of Aqueous Dispersion E-2 of Acid-Modified Polyolefin Resin]

"Bondine HX-8290 (hereinafter, sometimes abbreviated as "HX8290")" manufactured by Arkema Co., Ltd. was used as an acid-modified polyolefin resin, and the same operations as in the production of the aqueous dispersion E-1 were performed to yield an aqueous dispersion "E-2" of an acid-modified polyolefin resin.

[Production of Aqueous Dispersion E-3 of Acid-Modified Polyolefin Resin]

"Bondine LX-4110 (hereinafter, sometimes abbreviated as "LX4110")" manufactured by Arkema Co., Ltd. was used as an acid-modified polyolefin resin, and the same operations as in the production of the aqueous dispersion E-1 were performed to yield an aqueous dispersion "E-3" of an acid-modified polyolefin resin.

[Production of Aqueous Dispersion E-4 of Acid-Modified Polyolefin Resin]

"Bondine AX-8390 (hereinafter, sometimes abbreviated as "AX-8390")" manufactured by Arkema. Co., Ltd. was used as an acid-modified polyolefin resin, and the same operations as in the production of the aqueous dispersion E-1 were performed to yield an aqueous dispersion "E-4" of an acid-modified polyolefin resin.

[Production of Aqueous Dispersion E-5 of Acid-Modified Polyolefin Resin]

"Lotader 3210 (hereinafter, sometimes abbreviated as "3210")" manufactured fay Arkema Co., Ltd. was used as an acid-modified polyolefin resin, and the same operations as in the production of the aqueous dispersion E-1 were performed to yield an aqueous dispersion "E-5" of an acid-modified polyolefin resin.

[Production of Aqueous Dispersion E-6 of Acid-Modified Polyolefin Resin]

By using a stirrer having a 1-liter volume, hermetically sealable pressure-resistant glass vessel equipped with a heater, 60.0 g of an ethylene-acrylic acid copolymer resin (Primacor 5980I, manufactured by Dow Chemical Co., hereinafter, sometimes abbreviated as "5980I"), 16.8 g of triethylamine and 223.2 g of distilled water were placed in the glass vessel, and stirred at a rotation speed of stirring blades set at 300 rpm. Thus, no precipitation of the granular form of the resin was found on the bottom of the vessel, and the resin was verified to babe a suspension state. Accordingly, after 10 minutes, while this state was being maintained, the power of the heater was turned on for heating. Thus, while the temperature within the reaction system was being maintained at 140 to 145° C., the reaction system was stirred further for 30 minutes. Then, the reaction system was cooled down to room temperature (about 25° C.) under stirring at the unaltered rotation speed of 300 rpm. And then, the resulting mixture was pressure-filtered (air pressure: 0.2 MPa), with a 300-mesh stainless steel filter (wire diameter: 0.035 mm, plain weave) to yield a slightly clouded aqueous dispersion "E-6," almost without finding any resin remaining on the filter.

[Production of Aqueous Dispersion E-7 of Acid-Modified Polyolefin Resin]

By using a stirrer having a 1-liter volume, hermetically sealable pressure-resistant glass vessel equipped with a heater, 30.0 g of an acid-modified polyolefin resin ("Rexpearl EAA A210K (hereinafter, sometimes abbreviated as "A210K," manufactured by Japan Polyethylene Corp.), 90.0 g of isopropanol, 10.0 g of triethylamine and 170.0 g of distilled water were placed in the glass vessel, and stirred at a rotation speed of stirring blades set at 300 rpm. Thus, no precipitation of the granular form of the resin was found on the bottom of the vessel, and the resin was verified to take a suspension state. Accordingly, after 10 minutes, while this state was being maintained, the power of the heater was turned on for heating. Thus, while the temperature within the reaction system was being maintained at 155 to 165° C., the reaction system was stirred further for 30 minutes. Then, the reaction system was cooled down to room temperature (about 250° C.) under stirring at the unaltered rotation speed of 300 rpm. And then, the resulting mixture was pressure-filtered (air pressure: 0.2 MPa), with a 300-mesh stainless steel filter (wire diameter: 0.035 mm, plain weave) to yield a milky white, uniform aqueous dispersion "E-7" of an acid-modified polyolefin resin.

Table 1 shows the compositions of the acid-modified polyolefin resins used in the production of the aqueous dispersions E-1 to E-7, The aqueous dispersions E-1 to E-5 were each an aqueous dispersions using an acid-modified polyolefin resin containing a (meth)acrylic acid ester component. On the contrary, the aqueous dispersions E-6 and E-7 were each an aqueous dispersion using an acid-modified polyolefin resin containing no (meth)acrylic acid ester component.

TABLE 1

| Acid-modified polyolefin resin | Composition (% by mass) | | | | | MFR (g/10 min) | Name of aqueous dispersion |
| --- | --- | --- | --- | --- | --- | --- | --- |
| | Ethylene | Ethyl acrylate | Butyl acrylate | Acrylic acid | Maleic anhydride | | |
| Bondine TX8030 | 85 | 12 | 0 | 0 | 3 | 3 | E-1 |
| Bondine HX8290 | 80 | 18 | 0 | 0 | 2 | 65 | E-2 |
| Bondine LX4110 | 92 | 5 | 0 | 0 | 3 | 5 | E-3 |
| Bondine AX8390 | 69.5 | 29 | 0 | 0 | 1.5 | 7 | E-4 |
| Lotader 3210 | 91 | 0 | 6 | 0 | 3 | 5 | E-5 |
| Primacor 59801 | 80 | 0 | 0 | 20 | 0 | 300 | E-6 |
| Rexpearl EAA A210K | 93 | 0 | 0 | 7 | 0 | 3 | E-7 |

[Production of Aqueous Solutions PVA1 to PVA4 of Polyvinyl Alcohol]

As polyvinyl alcohol, "VC-10," "JF-03," "JL-25E" and "JP-10" manufactured by Japan Vam & Poval Co., Ltd. were used, and were mixed with water and then heated and stirred to yield 8% by mass aqueous solutions of polyvinyl alcohol. The aqueous solutions of "VC-10," "JF-03," "JL-25E" and "JP-10" are referred to as "PVA1," "PVA2," "PVA3" and "PVA4," respectively.

The properties of the polyvinyl alcohols used as the starting materials are shown as follows.

VC-10: Average degree of polymerization: 1000, degree of saponification: 99.5 mol %

JF-03: Average degree of polymerization: 300, degree of saponification: 99.0 mol %

JL-25E: Average degree of polymerization: 2500, degree of saponification: 79.0 mol %

JP-10: Average degree of polymerisation: 1000, degree of saponification: 89.0 mol %

[Production of Aqueous Solution PVA5 of Polyvinyl Alcohol]

An ethylene-vinyl alcohol copolymer, "Soanol 16D (hereinafter, sometimes abbreviated as "16D") manufactured by Nippon Synthetic Chemical Industry Co., Ltd. was used as polyvinyl alcohol, mixed with 50% by mass isopropanol aqueous solution, and heated and stirred to yield a 8% by mass ethylene-vinyl alcohol copolymer aqueous solution (containing isopropanol). The obtained aqueous solution is referred to as "PVA5."

Example 1

The aqueous dispersion "E-1" of an acid-modified polyolefin resin and the aqueous solution "PVA1" of polyvinyl alcohol were used, and "E-1" and "PVA1" were mixed together under stirring in such a way that the content of the polyvinyl alcohol in "PVA1" was 0.1 part by mass in relation to 100 parts by mass of the acid-modified polyolefin resin in "E-1" to yield an aqueous dispersion containing an acid-modified polyolefin resin and polyvinyl alcohol. Additionally, water was added to the aqueous dispersion and stirred so as for the solid content concentration of the aqueous dispersion to be 8% by mass. The aqueous dispersion obtained as described above was referred to as the adhesive for packaging materials "AD1." The production method in which an aqueous dispersion of an acid-modified polyolefin resin and an aqueous solution of polyvinyl alcohol are prepared beforehand as described above, and then both of the aqueous dispersion and the aqueous solution are mixed with each other to produce an adhesive for packaging materials is referred to as a "blend method."

Examples 2 to 5

As compared to Example 1, in each of Examples 2 to 5, the mixing amount of "PVA1" was altered so as for the content of polyvinyl alcohol to foe the content in parts by mass shown in Table 2. In each of Examples 2 to 5, otherwise with the same operations as in Example 1, an aqueous dispersion was prepared. The aqueous dispersions obtained were referred to as "AD2 to AD5," respectively.

Examples 6 to 13

As compared to Example 1, in each of Examples 6 to 13, the type and the mixing amount of the aqueous solution of polyvinyl alcohol was altered in such a way that the type and the content of polyvinyl alcohol were the type and the value shown in Table 2. Specifically, Examples 6 and 7 used "PVA2," Examples 8 and 9 used "PVA3," Examples 10 and 11 used "PVA4," and Examples 12 and 13 used "PVA5." In each of Examples 0 to 13, otherwise with the same operations as in Example 1, an aqueous dispersion was prepared. The aqueous dispersions obtained were referred to as "AD6 to AD13," respectively.

Example 14

By using a stirrer having a 1-liter volume, hermetically sealable pressure-resistant glass vessel equipped with a heater, 60.0 g of "TX-8030," 0.6 g of "VC-10" (1 part by mass in relation to 100 parts by mass of TX3030), 90.0 g of isopropane-1, 3.0 g of triethylamine and 147.0 g of distilled water were placed in the glass vessel, and stirred at a rotation speed of stirring blades set at 300 rpm. Thus, no precipitation of the granular form of the resin was found on the bottom of the vessel, and the resin was verified to take a suspension state. Accordingly, after 10 minutes, while this state was being maintained, the power of the heater was turned on for heating. Thus, while the temperature within the reaction system was being maintained at 140 to 145° C., the reaction system was stirred further for 30 minutes. Then, the reaction system was cooled down to room temperature (about 25° C.) under stirring at the unaltered rotation speed of 300 rpm. Moreover, 456.9 g of water was placed in the glass vessel to regulate the solid content concentration so as to be 8% by mass. Then, the resulting mixture was pressure-filtered (air pressure: 0.2 MPa), with a 300-mesh stainless steel filter (wire diameter: 0.033 mm, plain weave) to yield a milky white, uniform aqueous dispersion. The aqueous dispersion was referred to as the adhesive for packaging materials AD14. The production method in which an acid-modified polyolefin resin and polyvinyl alcohol are dissolved and dispersed in a batch-wise manner into an aqueous dispersion to produce an adhesive for packaging materials is referred to as a "batch dispersion method."

Examples 15 to 18

In each of Examples 15 to 13, the type of the aqueous dispersion of the acid-modified polyolefin resin was altered so as to be the type shown in Table 2. Specifically, Example 15 used "E-2," Example 16 used "E-3," Example 17 used "E-4" and Example 18 used "E-5." In each of Examples 15 to 18, otherwise with the same operations as in Example 3, an aqueous dispersion was prepared. The aqueous dispersions obtained were referred to as "AD15 to AD18," respectively.

Comparative Example 1

The aqueous dispersion "E-1" of an acid-modified polyolefin resin was used, polyvinyl alcohol was not used, and water was added so as for the solid content concentration to be 8% by mass and stirred to yield an aqueous dispersion. The resulting aqueous dispersion was referred to as the adhesive N1.

Comparative Examples 2 and 3

As compared to Example 1, in each of Comparative Examples 2 and 3, the mixing amount of "PVA1" was altered so as for the content of polyvinyl alcohol to be the content in parts by mass shown in Table 2. In each of Comparative Examples 2 and 3, otherwise with the same operations as in Example 1, an aqueous dispersion was prepared. The aqueous dispersions obtained were referred to as the adhesives N2 and N3, respectively.

Comparative Example 4

As compared to Example 3, "E-6" was used as the aqueous dispersion of the acid-modified polyolefin resin so as to specify the type of the acid-modified polyolefin resin to be 5980I. Otherwise with the same operations as in Example 3, an aqueous dispersion was prepared. The aqueous dispersion obtained was referred to as the adhesive N4.

Comparative Example 5

As compared to Example 3, "E-7" was used as the aqueous dispersion of the acid-modified polyolefin resin so as to specify the type of the acid-modified polyolefin resin to be A210K. Otherwise with the same operations as in Example 3, an aqueous dispersion was prepared. The aqueous dispersion obtained was referred to as the adhesive N5.

For the adhesives for packaging materials AD1 to AD18 and the adhesives N1 to N5, the evaluations (number average particle size, dispersion stability with non-water-soluble solvent, adsorptivity of content components, wafer resistance and warping of barrier layer) were performed. Table 2 shows the compositions, production methods and evaluation results of these adhesives.

TABLE 2

| | | | Adhesive for packaging material | | | | |
|---|---|---|---|---|---|---|---|
| | | | Composition of adhesive | | | | |
| | | | Acid-modified polyolefin resin | | Polyvinyl alcohol | | |
| | | Name of adhesive | Name of aqueous dispersion | Type | Name of aqueous solution | Type | parts by mass | Production method |
| Examples | 1 | AD1 | E-1 | TX8030 | PVA1 | VC-10 | 0.1 | Blend method |
| | 2 | AD2 | E-1 | TX8030 | PVA1 | VC-10 | 0.5 | Blend method |
| | 3 | AD3 | E-1 | TX8030 | PVA1 | VC-10 | 1 | Blend method |
| | 4 | AD4 | E-1 | TX8030 | PVA1 | VC-10 | 5 | Blend method |
| | 5 | AD5 | E-1 | TX8030 | PVA1 | VC-10 | 9 | Blend method |
| | 6 | AD6 | E-1 | TX8030 | PVA2 | JF-03 | 0.5 | Blend method |
| | 7 | AD7 | E-1 | TX8030 | PVA2 | JF-03 | 1 | Blend method |
| | 8 | AD8 | E-1 | TX8030 | PVA3 | JL-25E | 0.5 | Blend method |
| | 9 | AD9 | E-1 | TX8030 | PVA3 | JL-25E | 1 | Blend method |
| | 10 | AD10 | E-1 | TX8030 | PVA4 | JP-10 | 0.5 | Blend method |
| | 11 | AD11 | E-1 | TX8030 | PVA4 | JP-10 | 1 | Blend method |
| | 12 | AD12 | E-1 | TX8030 | PVA5 | 16D | 0.5 | Blend method |
| | 13 | AD13 | E-1 | TX8030 | PVA5 | 16D | 1 | Blend method |
| | 14 | AD14 | — | TX8030 | PVA1 | VC-10 | 1 | Batch dispersion method |
| | 15 | AD15 | E-2 | HX8290 | PVA1 | VC-10 | 1 | Blend method |
| | 16 | AD16 | E-3 | LX4110 | PVA1 | VC-10 | 1 | Blend method |
| | 17 | AD17 | E-4 | AX8390 | PVA1 | VC-10 | 1 | Blend method |
| | 18 | AD18 | E-5 | 3210 | PVA1 | VC-10 | 1 | Blend method |
| Comparative Examples | 1 | N1 | E-1 | TX8030 | — | — | 0 | — |
| | 2 | N2 | E-1 | TX8030 | PVA1 | VC-10 | 0.05 | Blend method |
| | 3 | N3 | E-1 | TX8030 | PVA1 | VC-10 | 12 | Blend method |
| | 4 | N4 | E-6 | 59801 | PVA1 | VC-10 | 1 | Blend method |
| | 5 | N5 | E-7 | A210K | PVA1 | VC-10 | 1 | Blend method |

| | | Adhesive for packaging material | | | | |
|---|---|---|---|---|---|---|
| | | Number average particle size (nm) | Dispersion stability with non-water-soluble solvent | Adsorptivity of content components (%) | Water resistance | Warping of barrier layer |
| Examples | 1 | 85 | Average | 22 | Average | Average |
| | 2 | 83 | Good | 20 | Average | Excellent |
| | 3 | 86 | Good | 17 | Average | Excellent |
| | 4 | 84 | Good | 15 | Poor | Excellent |
| | 5 | 85 | Good | 14 | Poor | Excellent |
| | 6 | 84 | Good | 21 | Average | Excellent |
| | 7 | 84 | Good | 18 | Average | Excellent |
| | 8 | 83 | Good | 22 | Average | Average |
| | 9 | 85 | Good | 20 | Average | Good |
| | 10 | 85 | Good | 21 | Average | Good |
| | 11 | 83 | Good | 18 | Average | Excellent |
| | 12 | 84 | Good | 23 | Average | Average |
| | 13 | 84 | Average | 21 | Average | Average |
| | 14 | 67 | Good | 17 | Average | Excellent |
| | 15 | 76 | Good | 18 | Average | Excellent |
| | 16 | 82 | Good | 16 | Average | Excellent |
| | 17 | 84 | Good | 20 | Average | Excellent |
| | 18 | 84 | Good | 18 | Average | Excellent |
| Comparative Examples | 1 | 85 | Bad | 24 | Good | Bad |
| | 2 | 84 | Bad | 24 | Good | Bad |
| | 3 | 84 | Good | 13 | Bad | Excellent |
| | 4 | 17 | Average | 32 | Poor | Poor |
| | 5 | 87 | Average | 27 | Poor | Poor |

Example 19

A 12-μm-thick biaxially stretched PET film and a 7-μm-thick aluminum foil were laminated on each other with a two-component type polyurethane-based adhesive to yield a laminate having a barrier layer. To the aluminum foil surface of the laminate, "AD1" was applied so as for the amount of the adhesive layer after drying to be 0.5 g/m² and dried at 100° C. for 120 seconds to form an adhesive layer.

Next, by using a laminator equipped with an extruder, LOPE (L211, manufactured by Sumitomo Chemical Co., Ltd.) was melt-extruded at 320° C. as a sealant resin onto the surface of the adhesive layer to yield a laminate film as a packaging material, having a sealant layer formed of a 25-μm LDPE layer.

Examples 20 to 35

As compared to Example 19, in each of Examples 20 to 35, the type of the adhesive for packaging materials was altered to the type shown in Table 3. Otherwise, by performing the same operations as in Example 19, laminate films as packaging materials were obtained.

Examples 36 to 38

As compared to Example 21, in each of Examples 36 to 38, the application amount of "AD3" was altered so as for the amount of the adhesive layer after drying to be the amount shown in Table 3. Otherwise, by performing the same operations as in Example 21, laminate films as packaging materials were obtained.

Example 39

As a film having a barrier layer, a commercially available aluminum vapor-deposited film ("Metaline ML-PET," manufactured by Tohcello Co., Ltd.) was used, and "AD3" was applied to the aluminum vapor-deposited surface. Otherwise, by performing the same operations as in Example 21, a laminate film as a packaging material was obtained. With respect to the gas barrier performance of "Metaline ML-PET," the oxygen permeability was 10 ml/m²·day·MPa and the water vapor permeability was 1 g/m²·day.

Example 40

A 12-μn-thick biaxially stretched PET film and a 7-μm-thick aluminum foil were laminated on each other with a two-component type polyurethane-based adhesive to yield a laminate having a barrier layer. To the aluminum foil surface of the laminate, "AD3" was applied so as for the amount of the adhesive layer after drying to be 5 g/m² and dried at 100° C. for 120 seconds to form an adhesive layer.

Next, by using a laminator equipped with an extruder, PP ("Ultrazex 1520L," manufactured by Prime Polymer Co., Ltd.) was melt-extruded at 290° C. as a sealant resin onto the surface of the adhesive layer to yield a laminate film as a packaging material, having a sealant layer formed of a 25-μm PP layer.

Comparative Examples 6 to 9

In place of the adhesive for packaging materials, the adhesives "N2 to N5" shown in Table 3 were used. Otherwise, by performing the same operations as in Example 19, laminate films as packaging materials were obtained.

Comparative Example 10

As compared to Example 19, in place of the adhesive for packaging materials AD1, a polyurethane resin aqueous dispersion ("Adeka Bontiter HUX380," manufactured by Asahi Denka Kogyo Co., Ltd.) was used. Otherwise, by performing the same operations as in Example 19, a laminate film as a packaging materials was obtained.

For each of the laminate films, namely, the packaging materials obtained in Examples 19 to 40 and Comparative Examples 6 to 10, the evaluations of the laminate strengths before and after the content resistance test and the tear property were performed. As the content in the content resistance test, two different contents, namely, a lump of absorbent cotton impregnated with 1 g of Tabasco (registered trademark) and another lump of adsorbent cotton impregnated with 1 g of toluene were used. The evaluation of the tear property was performed, at the time of unsealing the bag after the content resistance test using Tabasco.

The evaluation results are shown in Table 3. In Comparative Examples 8 to 10, delamination occurred between the sealant layer and the barrier layer during the content, resistance test, and hence the laminate strength measurement was not able to be performed.

TABLE 3

| | | Packaging material | | | | | | |
|---|---|---|---|---|---|---|---|---|
| | | | | | Amount of | Lamine strength (N/15 mm) | | |
| | | Adhesive for | | Sealant | adhesive | Before content | After content resistance test | |
| | | packaging material | Barrier layer | layer | (g/m²) | resistance test | Tabasco | Toluence | Tear property |
| Examples | 19 | AD1 | Aluminum foil | LDPE | 0.5 | Unpeelable | 3.5 | 4.0 | Good |
| | 20 | AD2 | Aluminum foil | LDPE | 0.5 | Unpeelable | 6.0 | 6.0 | Good |
| | 21 | AD3 | Aluminum foil | LDPE | 0.5 | Unpeelable | 6.5 | 6.5 | Good |
| | 22 | AD4 | Aluminum foil | LDPE | 0.5 | Unpeelable | 6.0 | 6.5 | Good |
| | 23 | AD5 | Aluminum foil | LDPE | 0.5 | 6.2 | 4.2 | 4.9 | Good |
| | 24 | AD6 | Aluminum foil | LDPE | 0.5 | Unpeelable | 4.0 | 3.7 | Good |
| | 25 | AD7 | Aluminum foil | LDPE | 0.5 | Unpeelable | 4.3 | 3.9 | Good |
| | 26 | AD8 | Aluminum foil | LDPE | 0.5 | Unpeelable | 5.6 | 5.8 | Good |
| | 27 | AD9 | Aluminum foil | LDPE | 0.5 | Unpeelable | 6.0 | 6.1 | Good |
| | 28 | AD10 | Aluminum foil | LDPE | 0.5 | Unpeelable | 5.8 | 5.9 | Good |

TABLE 3-continued

<table>
<tr><th colspan="9">Packaging material</th></tr>
<tr><th colspan="4"></th><th>Amount of</th><th colspan="3">Lamine strength (N/15 mm)</th><th></th></tr>
<tr><th colspan="2">Adhesive for</th><th>Barrier layer</th><th>Sealant layer</th><th>adhesive (g/m²)</th><th>Before content resistance test</th><th colspan="2">After content resistance test</th><th>Tear property</th></tr>
<tr><th></th><th>packaging material</th><th></th><th></th><th></th><th></th><th>Tabasco</th><th>Toluence</th><th></th></tr>
<tr><td></td><td>29 AD11</td><td>Aluminum foil</td><td>LDPE</td><td>0.5</td><td>Unpeelable</td><td>6.3</td><td>6.4</td><td>Good</td></tr>
<tr><td></td><td>30 AD12</td><td>Aluminum foil</td><td>LDPE</td><td>0.5</td><td>Unpeelable</td><td>6.0</td><td>6.1</td><td>Good</td></tr>
<tr><td></td><td>31 AD13</td><td>Aluminum foil</td><td>LDPE</td><td>0.5</td><td>Unpeelable</td><td>6.3</td><td>6.5</td><td>Good</td></tr>
<tr><td></td><td>32 AD15</td><td>Aluminum foil</td><td>LDPE</td><td>0.5</td><td>Unpeelable</td><td>5.0</td><td>4.6</td><td>Good</td></tr>
<tr><td></td><td>33 AD16</td><td>Aluminum foil</td><td>LDPE</td><td>0.5</td><td>Unpeelable</td><td>6.0</td><td>6.1</td><td>Good</td></tr>
<tr><td></td><td>34 AD17</td><td>Aluminum foil</td><td>LDPE</td><td>0.5</td><td>Unpeelable</td><td>3.2</td><td>3.9</td><td>Good</td></tr>
<tr><td></td><td>35 AD18</td><td>Aluminum foil</td><td>LDPE</td><td>0.5</td><td>Unpeelable</td><td>5.6</td><td>5.6</td><td>Good</td></tr>
<tr><td></td><td>36 AD3</td><td>Aluminum foil</td><td>LDPE</td><td>0.001</td><td>4.5</td><td>2.8</td><td>2.9</td><td>Good</td></tr>
<tr><td></td><td>37 AD3</td><td>Aluminum foil</td><td>LDPE</td><td>3</td><td>Unpeelable</td><td>6.6</td><td>6.4</td><td>Good</td></tr>
<tr><td></td><td>38 AD3</td><td>Aluminum foil</td><td>LDPE</td><td>5</td><td>Unpeelable</td><td>6.0</td><td>6.1</td><td>Good</td></tr>
<tr><td></td><td>39 AD3</td><td>Aluminum vapor deposition</td><td>LDPE</td><td>0.5</td><td>Unpeelable</td><td>5.5</td><td>5.4</td><td>Good</td></tr>
<tr><td></td><td>40 AD3</td><td>Aluminum foil</td><td>PP</td><td>5</td><td>Unpeelable</td><td>4.0</td><td>4.4</td><td>Good</td></tr>
<tr><td>Comparative Examples</td><td>6 N2</td><td>Aluminum foil</td><td>LDPE</td><td>0.5</td><td>Unpeelable</td><td>1.9</td><td>2.5</td><td>Good</td></tr>
<tr><td></td><td>7 N3</td><td>Aluminum foil</td><td>LDPE</td><td>0.5</td><td>4.0</td><td>2.3</td><td>3.0</td><td>Good</td></tr>
<tr><td></td><td>8 N4</td><td>Aluminum foil</td><td>LDPE</td><td>0.5</td><td>6.0</td><td>Occurrence of delamination</td><td>Occurrence of delamination</td><td>Bad</td></tr>
<tr><td></td><td>9 N5</td><td>Aluminum foil</td><td>LDPE</td><td>0.5</td><td>6.5</td><td>Occurrence of delamination</td><td>Occurrence of delamination</td><td>Bad</td></tr>
<tr><td></td><td>10 Polyurethane</td><td>Aluminum foil</td><td>LDPE</td><td>0.5</td><td>5.0</td><td>Occurrence of delamination</td><td>Occurrence of delamination</td><td>Bad</td></tr>
</table>

As Examples 1 to 18, the adhesives for packaging materials, being each an aqueous dispersion including the acid-modified polyolefin resin containing a (meth)acrylic acid ester component, polyvinyl alcohol, and an aqueous medium, wherein the content of polyvinyl alcohol is 0.1 to 10 parts by mass in relation to 100 parts by mass of the acid-modified polyolefin resin, have been found to have excellent effects with respect to the dispersion stability with, the non-water-soluble solvent, the adsorptivity of the content components and the warping of the barrier layer.

The packaging materials (Examples 19 to 40) obtained by including, as the adhesive layers thereof, these adhesives for packaging materials have been found to be excellent in content resistance and tear property. In particular, as can be seen from a comparison between the results of Examples 2, 6 and 10 and the results of Example 8, and a comparison between the results of Examples 3, 7 and 11 and the results of Example 9, the adhesives using the polyvinyl alcohols (VC-10, JF-03 and JP-10) having a degree of saponification of 80 to 99.9 mol % were shown to be lower in the adsorptivity (%) of content components and advantageous in obtaining the adhesive layer hardly degradable in the adsorption suppression effect of the content components, as compared with the adhesives using the polyvinyl alcohol (JL-25E) having a degree of saponification of less than 80 mol %.

Moreover, as can be seen from a comparison between the results of Examples 20, 26 and 28 and the results of Example 24, and a comparison between the results of Examples 21, 27 and 29 and the results of Example 23, the use of a polyvinyl alcohol having a high average degree of polymerization in the adhesive has been shown to be advantageous in improvement of the content resistance of a packaging material when such an adhesive is used in the packaging material.

On the other hand, none of the adhesives (Comparative Examples 1 to 5) other than the adhesives for packaging materials of the present invention exhibited excellent effects on all of the dispersion stability with a norm water-soluble solvent, the absorptivity of the content components and the warping of the barrier layer.

The packaging materials (Comparative Examples 6 to 10) obtained by using the adhesives other than the adhesives for packaging materials of the present invention as the adhesive layers were found to be poor in content resistance and tear property.

Examples 41 to 54 and Comparative Examples 11 to 15

Laminate films as packaging materials were prepared under the same conditions shown in Table 4 as in Examples 19 to 40 and Comparative Examples 6 to 10 (laminate films as packaging materials were prepared: in Example 41 in the same manner as in Example 19, in Example 42 in the same manner as in Example 20, in Example 43 in the same manner as in Example 21, in Example 44 in the same manner as in Example 22, in Example 45 in the same manner as in Example 23, in Example 46 in the same manner as in Example 25, in Example 47 in the same manner as in Example 27, in Example 48 in the same manner as in Example 31, in Example 49 in the same manner as in Example 32, in Example 59 in the same manner as in Example 36, in Example 51 in the same manner as in Example 37, in Example 52 in the same manner as in Example 38, in Example 53 in the same manner as in Example 39, in Example 54 in the same manner as in Example 40, in Comparative Example 11 in the same manner as in Comparative Example 6, in Comparative Example 12 in the same manner as in Comparative Example 7, in Comparative Example 13 in the same manner as in Comparative Example 8, in Comparative Example 14 in the same manner as in Comparative Example 9, and in Comparative Example 15 in the same manner as in Comparative Example 10).

Next, lumps or absorbent cotton impregnated with the various contents shown in Table 4, respectively, were prepared, wherein the impregnation amount of each of the contents was 1 g. The contents used in the test are listed below.

Alcoholic beverage (Satsuma Shiranami, alcohol percentage: 25%, manufactured by Satsuma Shuso Co., Ltd.)
Liquid detergent (Top Nanox, manufactured by Lion Corp.)
Shampoo (Super Mild Shampoo, manufactured by Shiseido Co., Ltd.)
Rinse (Super Mild Conditioner, manufactured by Shiseido Co., Ltd.)
Battery electrolyte (Pure Light (registered trademark), manufactured by Ube Industries, Ltd.)
Vinegar (cereal vinegar, manufactured by Mitskan, Inc.)
Oil (Nisshin Salad Oil, manufactured by Nisshin OiliO Group, Ltd.)

For each of the laminate films, namely, the packaging materials obtained in Examples 41 to 54 and Comparative Examples 11 to 15, the evaluations of the laminate strengths before and after the content, resistance test were performed by using the above-described various lumps of absorbent cotton as the contents in the content resistance test, in the same manners as in Examples 15 to 40 and Comparative Examples 6 to 10. The evaluation results are shown in Table 4.

TABLE 4

| | | Packaging material | | | | | |
|---|---|---|---|---|---|---|---|
| | | | | | | Laminate stregths (N/15 mm) | |
| | | Adhesive for packaging material | Barrier layer | Sealant layer | Amount of adhesive (g/m$^2$) | Before content resistance test | After content resistance test |
| | | | | | | | Alcoholic bevarage |
| Examples | 41 | AD1 | Aluminum foil | LDPE | 0.5 | Unpeelable | Unpeelable |
| | 42 | AD2 | Aluminum foil | LDPE | 0.5 | Unpeelable | Unpeelable |
| | 43 | AD3 | Aluminum foil | LDPE | 0.5 | Unpeelable | Unpeelable |
| | 44 | AD4 | Aluminum foil | LDPE | 0.5 | Unpeelable | Unpeelable |
| | 45 | AD5 | Aluminum foil | LDPE | 0.5 | 6.2 | 6.2 |
| | 46 | AD7 | Aluminum foil | LDPE | 0.5 | Unpeelable | Unpeelable |
| | 47 | AD9 | Aluminum foil | LDPE | 0.5 | Unpeelable | Unpeelable |
| | 48 | AD13 | Aluminum foil | LDPE | 0.5 | Unpeelable | Unpeelable |
| | 49 | AD15 | Aluminum foil | LDPE | 0.5 | Unpeelable | Unpeelable |
| | 50 | AD3 | Aluminum foil | LDPE | 0.001 | 4.5 | 4.3 |
| | 51 | AD3 | Aluminum foil | LDPE | 3 | Unpeelable | Unpeelable |
| | 52 | AD3 | Aluminum foil | LDPE | 5 | Unpeelable | Unpeelable |
| | 53 | AD3 | Aluminum vapor deposition | LDPE | 0.5 | Unpeelable | Unpeelable |
| | 54 | AD3 | Aluminum foil | PP | 5 | Unpeelable | 6.2 |
| Comparative Examples | 11 | N2 | Aluminum foil | LDPE | 0.5 | Unpeelable | Unpeelable |
| | 12 | N3 | Aluminum foil | LDPE | 0.5 | 4.0 | 3.9 |
| | 13 | N4 | Aluminum foil | LDPE | 0.5 | 6.0 | Occurrence of delamination |
| | 14 | N5 | Aluminum foil | LDPE | 0.5 | 6.5 | Occurrence of delamination |
| | 15 | Polyurethane | Aluminum foil | LDPE | 0.5 | 5.0 | Occurrence of delamination |

| | | Packaging material Laminate stregths (N/15 mm) After content resistance test | | | | |
|---|---|---|---|---|---|---|
| | | Liquid detergent | Shampoo | Rinse | Battery electrolyte | Vinegar | Oil |
| Examples | 41 | Unpeelable | Unpeelable | Unpeelable | Unpeelable | Unpeelable | Unpeelable |
| | 42 | Unpeelable | Unpeelable | Unpeelable | Unpeelable | Unpeelable | Unpeelable |
| | 43 | Unpeelable | Unpeelable | Unpeelable | Unpeelable | Unpeelable | Unpeelable |
| | 44 | Unpeelable | Unpeelable | Unpeelable | Unpeelable | Unpeelable | Unpeelable |
| | 45 | 6.1 | 6.0 | 6.1 | 5.5 | 5.9 | 5.3 |
| | 46 | Unpeelable | Unpeelable | Unpeelable | Unpeelable | Unpeelable | Unpeelable |
| | 47 | Unpeelable | Unpeelable | Unpeelable | Unpeelable | Unpeelable | Unpeelable |
| | 48 | Unpeelable | Unpeelable | Unpeelable | Unpeelable | Unpeelable | Unpeelable |
| | 49 | Unpeelable | Unpeelable | Unpeelable | Unpeelable | Unpeelable | Unpeelable |
| | 50 | 4.4 | 4.5 | 4.4 | 3.5 | 3.9 | 4.1 |
| | 51 | Unpeelable | Unpeelable | Unpeelable | Unpeelable | Unpeelable | Unpeelable |
| | 52 | Unpeelable | Unpeelable | Unpeelable | Unpeelable | Unpeelable | Unpeelable |
| | 53 | Unpeelable | Unpeelable | Unpeelable | Unpeelable | Unpeelable | Unpeelable |
| | 54 | 6.0 | 6.3 | 6.1 | 6.9 | 6.3 | Unpeelable |
| Comparative Examples | 11 | Unpeelable | Unpeelable | Unpeelable | Unpeelable | Unpeelable | Unpeelable |
| | 12 | 4.0 | 4.0 | 3.9 | 3.5 | 3.9 | 3.8 |
| | 13 | Occurrence of delamination | Occurrence of delamination | Occurrence of delamination | Occurrence of delamination | Occurrence of delamination | Occurrence of delamination |
| | 14 | Occurrence of delamination | Occurrence of delamination | Occurrence of delamination | Occurrence of delamination | Occurrence of delamination | Occurrence of delamination |
| | 15 | Occurrence of delamination | Occurrence of delamination | Occurrence of delamination | Occurrence of delamination | Occurrence of delamination | Occurrence of delamination |

As Examples 41 to 54, the packaging materials containing 0.1 to 10 parts by mass of polyvinyl alcohol in relation to 100 parts by mass of the acid-modified polyolefin resin containing a (meth)acrylic acid ester component have been found to have excellent effects on the resistance against the various contents.

Examples 55 to 68 and Comparative Examples 16 to 20

Laminate films as packaging materials were prepared under the same conditions shown in Table 5 as in Examples 41 to 54 and Comparative Examples 11 to 15. The evaluations of the laminate strengths before and after the content resistance test were performed in the same manner as in Examples 41 to 54 and Comparative Examples 11 to 15 (laminate films as packaging materials were prepared, and the evaluations of the laminate strengths before and after the content resistance test were performed: in Example 55 in the same manners as in Example 41, in Example 56 in the same manners as in Example 42, in Example 57 in the same manners as in Example 43, in Example 58 in the same manners as in Example 44, in Example 59 in the same manners as in Example 45, in Example 60 in the same manners as in Example 46, in Example 61 in the same manners as in Example 47, in Example 62 in the same manners as in Example 48, in Example 63 in the same manners as in Example 49, in Example 64 in the same manners as in Example 50, in Example 65 in the same manners as in Example 51, in Example 66 in the same manners as in Example 52, in Example 67 in the same manners as in Example 53, in Example 68 in the same manners as in Example 54, in Comparative Example 16 in the same manners as in Comparative Example 11, in Comparative Example 17 in the same manners as in Comparative Example 12, in Comparative Example 18 in the same manners as in Comparative Example 13, in Comparative Example 19 in the same manners as in Comparative Example 14, and in Comparative Example 20 in the same manners as in Comparative Example 15). The contents used in the test are listed below, and the evaluation results are shown in Table 5.

Dentifrice (Dent Health Medical Dentifrice SP, manufactured by Lion Corp.)

Face wash (Biore skin care face wash, moisture, manufactured by Kao Corp.)

Cleansing formulation (Predia cleasing cream, manufactured by KOSE Corp.)

Analgesic (Vantelin Kowa cream LT, manufactured by Kowa Co., Ltd.)

Antipruritic (Muhi S, manufactured by Ikedamohando Co., Ltd.)

Wasabi (Japanese horseradish) (raw genuine Wasabi, manufactured by S&B Foods Inc.)

Mustard (coarse-ground mustard seeds, manufactured by Kewpie Corp.)

Grated ginger (real raw ginger, manufactured by S&B Foods Inc.)

Condensed milk (Hokkaido condensed milk, manufactured by Snow Brand Milk products Co., Ltd.)

Jelly drink (Welder in Jelly energy in, manufactured by Morinaga & Co., Ltd.)

TABLE 5

| | | Adhesive for packaging material | Barrier layer | Sealant layer | Amount of adhesive (g/m²) | Before content resistance test | After content resistance test — Laminate strengths (N/15 mm) | | | | | | | | | |
|---|---|---|---|---|---|---|---|---|---|---|---|---|---|---|---|---|
| | | | | | | | Dentrifice | Face wash | Cleansing formulation | Analgesic | Antipruritic | Wasabi | Mustard | Grated ginger | Condensed milk | Jelly drink |
| Examples | 55 | AD1 | Aluminum foil | LDPE | 0.5 | Unpeelable | 5.8 | 5.6 | 5.6 | 3.1 | 3.3 | 3.8 | 4.3 | 5.0 | Unpeelable | Unpeelable |
| | 56 | AD2 | Aluminum foil | LDPE | 0.5 | Unpeelable | Unpeelable | Unpeelable | Unpeelable | 5.5 | 5.6 | 6.0 | 6.2 | Unpeelable | Unpeelable | Unpeelable |
| | 57 | AD3 | Aluminum foil | LDPE | 0.5 | Unpeelable | Unpeelable | Unpeelable | Unpeelable | 5.9 | 6.2 | 6.3 | Unpeelable | Unpeelable | Unpeelable | Unpeelable |
| | 58 | AD4 | Aluminum foil | LDPE | 0.5 | Unpeelable | Unpeelable | Unpeelable | Unpeelable | 5.8 | 5.9 | 6.1 | 6.2 | Unpeelable | Unpeelable | Unpeelable |
| | 59 | AD5 | Aluminum foil | LDPE | 0.5 | 6.2 | 6.0 | 5.9 | 5.7 | 3.5 | 3.8 | 4.5 | 4.8 | 5.2 | 6.1 | 6.2 |
| | 60 | AD7 | Aluminum foil | LDPE | 0.5 | Unpeelable | Unpeelable | Unpeelable | Unpeelable | 3.9 | 4.1 | 4.4 | 4.6 | Unpeelable | Unpeelable | Unpeelable |
| | 61 | AD9 | Aluminum foil | LDPE | 0.5 | Unpeelable | Unpeelable | Unpeelable | Unpeelable | 5.6 | 5.2 | 6.1 | 6.3 | Unpeelable | Unpeelable | Unpeelable |
| | 62 | AD13 | Aluminum foil | LDPE | 0.5 | Unpeelable | Unpeelable | Unpeelable | Unpeelable | 5.5 | 5.3 | 6.1 | 6.1 | Unpeelable | Unpeelable | Unpeelable |
| | 63 | AD15 | Aluminum foil | LDPE | 0.5 | Unpeelable | Unpeelable | Unpeelable | Unpeelable | 4.4 | 4.6 | 5.3 | 5.5 | Unpeelable | Unpeelable | Unpeelable |
| | 64 | AD3 | Aluminum foil | LDPE | 0.001 | 4.5 | 4.5 | 4.3 | 4.2 | 2.0 | 2.1 | 2.5 | 2.6 | 4.3 | 4.5 | 4.5 |
| | 65 | AD3 | Aluminum foil | LDPE | 3 | Unpeelable | Unpeelable | Unpeelable | Unpeelable | 6.0 | 6.3 | 6.6 | Unpeelable | Unpeelable | Unpeelable | Unpeelable |
| | 66 | AD3 | Aluminum foil | LDPE | 5 | Unpeelable | Unpeelable | Unpeelable | Unpeelable | 6.0 | 6.1 | 6.5 | Unpeelable | Unpeelable | Unpeelable | Unpeelable |
| | 67 | AD3 | Aluminum vapor deposition | LDPE | 0.5 | Unpeelable | Unpeelable | Unpeelable | Unpeelable | 4.6 | 4.9 | 5.5 | 5.9 | Unpeelable | Unpeelable | Unpeelable |
| | 68 | AD3 | Aluminum foil | PP | 5 | Unpeelable | 6.2 | 6.3 | 6.2 | 2.8 | 2.0 | 4.0 | 4.2 | 6.3 | Unpeelable | Unpeelable |
| Comparative Examples | 16 | N2 | Aluminum foil | LDPE | 0.5 | Unpeelable | 5.1 | 4.7 | 4.8 | 1.7 | 2.0 | 1.9 | 2.4 | 4.3 | Unpeelable | Unpeelable |
| | 17 | N3 | Aluminum foil | LDPE | 0.5 | 4.0 | 2.5 | 2.1 | 2.0 | 1.3 | 1.5 | 1.5 | 1.8 | 2.0 | 3.7 | 4.0 |
| | 18 | N4 | Aluminum foil | LDPE | 0.5 | 6.0 | Occurrence of delamination | Occurrence of delamination | Occurrence of delamination | Occurrence of delamination | Occurrence of delamination | Occurrence of delamination | Occurrence of delamination | Occurrence of delamination | Occurrence of delamination | Occurrence of delamination |

TABLE 5-continued

| | | | | Laminate stregths (N/15 mm) | | | | | | | | | | |
|---|---|---|---|---|---|---|---|---|---|---|---|---|---|---|
| | | | | | After content resistance test | | | | | | | | | |
| Adhesive for packaging material | Barrier layer | Sealant layer | Amount of adhesive (g/m²) | Before content resistance test | Dentrifice | Face wash | Cleansing formulation | Analgesic | Antipruritic | Wasabi | Mustard | Grated ginger | Condensed milk | Jelly drink |
| 19 N5 | Aluminum foil | LDPE | 0.5 | 6.5 | Occurrence of delamination | Occurrence of delamination | Occurrence of delamination | Occurrence of delamination | Occurrence of delamination | Occurrence of delamination | Occurrence of delamination | Occurrence of delamination | Occurrence of delamination | Occurrence of delamination |
| 20 Polyurethane | Aluminum foil | LDPE | 0.5 | 5.0 | Occurrence of delamination | Occurrence of delamination | Occurrence of delamination | Occurrence of delamination | Occurrence of delamination | Occurrence of delamination | Occurrence of delamination | Occurrence of delamination | Occurrence of delamination | Occurrence of delamination |

As Examples 55 to 68, the packaging materials containing 0.1 to 10 parts by mass of polyvinyl alcohol in relation to 100 parts by mass of the acid-modified polyolefin resin containing a (meth)acrylic acid ester component have been found to have excellent effects on the resistance against the various contents.

Examples 69 to 82 and Comparative Examples 21 to 25

Laminate films as packaging; materials were prepared under the same conditions shown in Table 6 as in Examples 41 to 54 and Comparative Examples 11 to 15. The evaluations of the laminate strengths before and after the content resistance test were performed in the same manner as in Examples 41 to 54 and Comparative Examples 11 to 15 (laminate films as packaging materials were prepared, and the evaluations of the laminate strengths before and after the content resistance test were performed: in Example 69 in the same manners as in Example 41, in Example 70 in the same manners as in Example 42, in Example 71 in the same manners as in Example 43, in Example 72 in the same manners as in Example 44, in Example 73 in the same manners as in Example 45, in Example 74 in the same manners as in Example 46, in Example 75 in the same manners as in Example 47, in Example 76 in the same manners as in Example 48, in Example 77 in the same manners as in Example 49, in Example 78 in the same manners as in Example 50, in Example 79 in the same manners as in Example 51, in Example 80 in the same manners as in Example 52, in Example 61 in the same manners as in Example 53, in Example 82 in the same manners as in Example 54, in Comparative Example 21 in the same manners as in Comparative Example 11, in Comparative Example 22 in the same manners as in Comparative Example 12, in Comparative Example 23 in the same manners as in Comparative Example 13, in Comparative Example 24 in the same manners as in Comparative Example 14, and in Comparative Example 25 in the same manners as in Comparative Example 15). The contents used in the test are listed below, and the evaluation results are shown in Table 6.

Capsicum (Chili pepper (powder), manufactured by S&B Foods Inc.)
Clove (Clove (powder), manufactured by S&B Foods Inc.)
Pepper (White pepper (powder), manufactured by S&B Foods Inc.)
Curry powder (Curry powder, manufactured by S&B Foods Inc.)
Bath additive ("Bub"-Forest aroma, manufactured by Kao Corp.)

TABLE 6

| | | Packaging material | | | | |
|---|---|---|---|---|---|---|
| | | Adhesive for packaging material | Barrier layer | Sealant layer | Amount of adhesive (g/m$^2$) | Laminate stregths (N/15 mm) Before content resistance test |
| Examples | 69 | AD1 | Aluminum foil | LDPE | 0.5 | Unpeelable |
| | 70 | AD2 | Aluminum foil | LDPE | 0.5 | Unpeelable |
| | 71 | AD3 | Aluminum foil | LDPE | 0.5 | Unpeelable |
| | 72 | AD4 | Aluminum foil | LDPE | 0.5 | Unpeelable |
| | 73 | AD5 | Aluminum foil | LDPE | 0.5 | 6.2 |
| | 74 | AD7 | Aluminum foil | LDPE | 0.5 | Unpeelable |
| | 75 | AD9 | Aluminum foil | LDPE | 0.5 | Unpeelable |
| | 76 | AD13 | Aluminum foil | LDPE | 0.5 | Unpeelable |
| | 77 | AD15 | Aluminum foil | LDPE | 0.5 | Unpeelable |
| | 78 | AD3 | Aluminum foil | LDPE | 0.001 | 4.5 |
| | 79 | AD3 | Aluminum foil | LDPE | 3 | Unpeelable |
| | 80 | AD3 | Aluminum foil | LDPE | 5 | Unpeelable |
| | 81 | AD3 | Aluminum vapor deposition | LDPE | 0.5 | Unpeelable |
| | 82 | AD3 | Aluminum foil | PP | 5 | Unpeelable |
| Comparative Examples | 21 | N2 | Aluminum foil | LDPE | 0.5 | Unpeelable |
| | 22 | N3 | Aluminum foil | LDPE | 0.5 | 4.0 |
| | 23 | N4 | Aluminum foil | LDPE | 0.5 | 6.0 |
| | 24 | N5 | Aluminum foil | LDPE | 0.5 | 6.5 |
| | 25 | Polyurethane | Aluminum foil | LDPE | 0.5 | 5.0 |

| | | Packaging material Laminate stregths (N/15 mm) After content resistance test | | | | |
|---|---|---|---|---|---|---|
| | | Capsicum | Clove | Pepper | Curry powder | Bath additive |
| Examples | 69 | 3.6 | 3.2 | 4.2 | 3.8 | Unpeelable |
| | 70 | 6.0 | 5.5 | Unpeelable | Unpeelable | Unpeelable |
| | 71 | 6.2 | 6.2 | Unpeelable | Unpeelable | Unpeelable |
| | 72 | 5.8 | 5.6 | Unpeelable | Unpeelable | Unpeelable |
| | 73 | 4.3 | 3.9 | 4.9 | 4.8 | 6.9 |
| | 74 | 4.0 | 4.0 | 5.2 | 4.4 | Unpeelable |
| | 75 | 6.0 | 5.4 | Unpeelable | Unpeelable | Unpeelable |
| | 76 | 6.1 | 5.8 | Unpeelable | Unpeelable | Unpeelable |
| | 77 | 5.1 | 4.7 | 6.3 | 6.0 | Unpeelable |
| | 78 | 3.2 | 2.6 | 3.9 | 3.8 | 4.2 |
| | 79 | 6.6 | 6.1 | Unpeelable | Unpeelable | Unpeelable |

TABLE 6-continued

|  |  |  |  |  |  |  |
|---|---|---|---|---|---|---|
|  | 80 |  |  | Unpeelable | Unpeelable | Unpeelable |
|  | 81 | 5.6 | 5.1 | 6.1 | 5.3 | Unpeelable |
|  | 82 | 3.0 | 2.7 | 4.9 | 5.8 | 4.4 |
| Comparative | 21 | 1.9 | 1.6 | 1.8 | 2.3 | Unpeelable |
| Examples | 22 | 2.2 | 2.0 | 1.9 | 2.6 | Occurence of delamination |
|  | 23 | Occurence of delamination | Occurence of delamination | Occurence of delamination | Occurence of delamination | Occurence of delamination |
|  | 24 | Occurence of delamination | Occurence of delamination | Occurence of delamination | Occurence of delamination | Occurence of delamination |
|  | 25 | Occurence of delamination | Occurence of delamination | Occurence of delamination | Occurence of delamination | Occurence of delamination |

As Examples 69 to 82, the packaging materials containing 0.1 to 10 parts by mass of polyvinyl alcohol in relation to 100 parts by mass of the acid-modified polyolefin resin containing a (meth)acrylic acid ester component have been found to have excellent effects on the resistance against the various contents.

As can be understood from the foregoing descriptions, the packaging materials of Examples 19 to 82 can be suitably used also as the packaging materials for use in repacking.

Examples 83 to 96 and Comparative Examples 26 to 30

Laminate films as packaging materials were prepared under the same conditions shown in Table 7 as in Examples 41 to 54 and Comparative Examples 11 to 15 (laminate films as packaging materials were prepared: in Example 83 in the same manners as in Example 41, in Example 84 in the same manners as in Example 42, in Example 85 in the same manners as in Example 43, in Example 86 in the same manners as in Example 44, in Example 87 in the same manners as in Example 45, in Example 88 in the same manners as in Example 46, in Example 89 in the same manners as in Example 47, in Example 90 in the same manners as in Example 48, in Example 91 in the same manners as in Example 49, in Example 92 in the same manners as in Example 50, in Example 93 in the same manners as in Example 51, in Example 94 in the same manners as in Example 52, in Example 95 in the same manners as in Example 53, in Example 96 in the same manners as in Example 54, in Comparative Example 26 in the same manners as in Comparative Example 11, in Comparative Example 27 in the same manners as in Comparative Example 12, in Comparative Example 28 in the same manners as in Comparative Example 13, in Comparative Example 29 in the same manners as in Comparative Example 14, and in Comparative Example 30 in the same manners as in Comparative Example 15). Additionally, for the purpose evaluating the chuck portion, packaging bags with a chuck were prepared under the above-described conditions. By using the packaging bags with a chuck, a test for the evaluation of the chuck portion before the content resistance test was performed. In each of the bags, 1 g of a bath additive ("Cool Bathclin (trade name)" manufactured by Tsumura & Co.) was placed as a content, and the evaluation of the chuck portion, after the content resistance test was performed. A test was also performed for the tear property at the time of unsealing of the bags after the content resistance test by using this bath additive. The evaluation results of the chuck portions are shown in Table 7, together with the results of the content resistance test and the results of the tear property test.

TABLE 7

| | | Packaging material | | | | | | | |
|---|---|---|---|---|---|---|---|---|---|
| | | Adhesive for packaging material | Barrier layer | Sealant layer | Amount of adhesive (g/m²) | Laminate stregths (N/15 mm) | | Evaluation of chuck portion | | Tear property |
| | | | | | | Before content resistance test | After content resistance test | Before content resistance test | After content resistance test | |
| Examples | 83 | AD1 | Aluminum foil | LDPE | 0.5 | Unpeelable | Unpeelable | Good | Good | Good |
| | 84 | AD2 | Aluminum foil | LDPE | 0.5 | Unpeelable | Unpeelable | Good | Good | Good |
| | 85 | AD3 | Aluminum foil | LDPE | 0.5 | Unpeelable | Unpeelable | Good | Good | Good |
| | 86 | AD4 | Aluminum foil | LDPE | 0.5 | Unpeelable | Unpeelable | Good | Good | Good |
| | 87 | AD5 | Aluminum foil | LDPE | 0.5 | 6.2 | 5.5 | Good | Good | Good |
| | 88 | AD7 | Aluminum foil | LDPE | 0.5 | Unpeelable | Unpeelable | Good | Good | Good |
| | 89 | AD9 | Aluminum foil | LDPE | 0.5 | Unpeelable | Unpeelable | Good | Good | Good |
| | 90 | AD13 | Aluminum foil | LDPE | 0.5 | Unpeelable | Unpeelable | Good | Good | Good |
| | 91 | AD15 | Aluminum foil | LDPE | 0.5 | Unpeelable | Unpeelable | Good | Good | Good |
| | 92 | AD3 | Aluminum foil | LDPE | 0.001 | 4.5 | 3.2 | Good | Good | Good |
| | 93 | AD3 | Aluminum foil | LDPE | 3 | Unpeelable | Unpeelable | Good | Good | Good |
| | 94 | AD3 | Aluminum foil | LDPE | 5 | Unpeelable | Unpeelable | Good | Good | Good |
| | 95 | AD3 | Aluminum vapor deposition | LDPE | 0.5 | Unpeelable | Unpeelable | Good | Good | Good |
| | 96 | AD3 | Aluminum foil | PP | 5 | Unpeelable | 3.3 | Good | Good | Good |
| Comparative Examples | 26 | N2 | Aluminum foil | LDPE | 0.5 | Unpeelable | Unpeelable | Good | Good | Bad |
| | 27 | N3 | Aluminum foil | LDPE | 0.5 | 4.0 | 3.5 | Good | Good | Bad |
| | 28 | N4 | Aluminum foil | LDPE | 0.5 | 6.0 | Occurence of delamination | Bad | Bad | Bad |

TABLE 7-continued

| | Adhesive for packaging material | Barrier layer | Sealant layer | Amount of adhesive (g/m²) | Laminate stregths (N/15 mm) Before content resistance test | After content resistance test | Evaluation of chuck portion Before content resistance test | After content resistance test | Tear property |
|---|---|---|---|---|---|---|---|---|---|
| 29 | N5 | Aluminum foil | LDPE | 0.5 | 6.5 | Occurence of delamination | Bad | Bad | Bad |
| 30 | Polyurethane | Aluminum foil | LDPE | 0.5 | 5.0 | Occurence of delamination | Bad | Bad | Bad |

The packaging bags with a chuck of Examples 83 to 96 were found to have excellent resistance against the contents in the same manner as in the packaging materials of other Examples, and additionally, in any one of the packaging bags with a chuck of Examples 83 to 96, the detachment of the chuck members from the chuck forming portion and the cracking of the chuck members were not observed even when the chuck was repeatedly opened and closed. Also, for the tear property, the packaging bags with a chuck of Examples 83 to 96 showed good results.

On the other hand, none of the packaging materials (Comparative Examples 26 to 30) each having an adhesive layer provided with a constitution other than the constitution specified by the present invention showed satisfactory results for all of the resistance against the content, the evaluation of the chuck portion and the tear property.

The invention claimed is:

1. An adhesive for packaging materials being in a form of an aqueous dispersion comprising an acid-modified polyolefin resin, including a (meth)acrylic acid ester component, polyvinyl alcohol and an aqueous medium, and not comprising an ethylene-vinyl acetate copolymer, wherein a content of polyvinyl alcohol is 0.1 to 10 parts by mass in relation to 100 parts by mass of the acid-modified polyolefin resin.

2. A packaging material comprising a barrier layer, an adhesive layer and a sealant layer laminated in this order, wherein the adhesive layer is formed of a coating film obtained from the adhesive for packaging materials according to claim 1.

3. The packaging material according to claim 2, wherein a degree of saponification of polyvinyl alcohol is 80 to 99.9 mol %.

4. The packaging material according to claim 2, wherein an average degree of polymerization of polyvinyl alcohol is 100 to 3000.

5. The packaging material according to claim 2, wherein an amount of the adhesive layer is in a range from 0.001 to 5 g/m².

6. The packaging material according to claim 2, wherein the barrier layer is constituted with aluminum.

7. The packaging material according to claim 2, wherein the sealant layer is constituted with a polyolefin resin.

8. The packaging material according to claim 7, wherein the polyolefin resin is a resin mainly composed of polyethylene or polypropylene.

9. The packaging material according to claim 2, wherein the packaging material is any of a packaging material for a content including a permeating component-containing liquid substance, a packaging material for a content including a permeating component-containing pasty substance and a packaging material for a content including a volatile component-containing solid.

10. The packaging material according to claim 9, wherein the permeating component-containing liquid substance is any of an alcoholic beverage, a liquid detergent, a shampoo, a rinse, a battery electrolyte, a vinegar and an oil.

11. The packaging material according to claim 9, wherein the permeating component-containing pasty substance is any of a cosmetic, a medicine, a seasoning and a food.

12. The packaging material according to claim 9, wherein the volatile component-containing solid is a spice or a bath additive.

13. The packaging material according to claim 2, wherein the packaging material is provided with a chuck having a constitution including a male portion and a female portion, as chuck members forming a pair, being capable of engaging with each other and being attached respectively to surfaces of a pair of sealant layers forming an internal surface of the packaging material.

14. The packaging material according to claim 2, wherein the packaging material is a packaging material for use in repacking.

15. A method for producing a packaging material, wherein the adhesive for packaging materials according to claim 1 is applied to at least one surface of the barrier layer and dried to form an adhesive layer, and then on the adhesive layer a molten sealant resin is laminated by extrusion lamination.

16. The packaging material according to claim 3, wherein an average degree of polymerization of polyvinyl alcohol is 100 to 3000.

* * * * *